(12) United States Patent
Gordon et al.

(10) Patent No.: US 7,607,152 B1
(45) Date of Patent: Oct. 20, 2009

(54) DEMAND-CAST SYSTEM AND BANDWIDTH MANAGEMENT FOR DELIVERY OF INTERACTIVE PROGRAMMING

(75) Inventors: Donald F. Gordon, Los Altos, CA (US); Sadik Bayrakeri, Foster City, CA (US); Edward A. Ludvig, Redwood City, CA (US); Eugene Gershtein, Redwood City, CA (US); Jeremy S. Edmonds, Castro Valley, CA (US); John P. Comito, Redwood City, CA (US); Alfred Li, Redwood City, CA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 09/538,562

(22) Filed: Mar. 29, 2000

Related U.S. Application Data

(63) Continuation-in-part of application No. 09/524,854, filed on Mar. 14, 2000, now Pat. No. 7,127,737.

(60) Provisional application No. 60/178,100, filed on Jan. 26, 2000.

(51) Int. Cl.
*H04N 7/16* (2006.01)
*G06F 3/00* (2006.01)

(52) U.S. Cl. .......................................... 725/54; 725/95

(58) Field of Classification Search ................... 725/54, 725/61, 95, 100, 103, 105, 120, 39–43, 86–87, 725/97; 370/211, 278–282; 375/240.26–240.28
See application file for complete search history.

(56) References Cited

U.S. PATENT DOCUMENTS

| | | | |
|---|---|---|---|
| 4,290,063 A | 9/1981 | Traster | 340/723 |
| 4,437,093 A | 3/1984 | Bradley | 340/726 |
| 4,496,976 A | 1/1985 | Swanson et al. | 358/147 |
| 4,520,356 A | 5/1985 | O'Keefe et al. | 340/750 |

(Continued)

FOREIGN PATENT DOCUMENTS

EP 0 758 833 A 2/1997

(Continued)

OTHER PUBLICATIONS

U.S. Appl. No. 60/034,489, Gordon et al.*

*Primary Examiner*—James Sheleheda
(74) *Attorney, Agent, or Firm*—Merchant & Gould

(57) ABSTRACT

A system for more efficient utilization of the finite bandwidth available for distribution of interactive program guide (IPG) video sequences. The system utilizes a session manager and a transport stream generator to enable a set top terminal to access an entire array of guide pages from the IPG within the constraints imposed by the limited bandwidth available in the distribution network.

One embodiment of the present invention comprises a system that includes a session manager (SM) and a transport stream generator (TSG) within a distribution control center. The SM monitors and controls usage of demand-cast stream bandwidth within the distribution network. The TSG receives information from the SM on each demand-cast stream. The information includes which set top terminals, if any, are currently acquiring the stream. The TSG uses the information to control the demand-cast streams multiplexed into the transport stream for distribution to the set top terminals.

16 Claims, 19 Drawing Sheets

U.S. PATENT DOCUMENTS

| | | | |
|---|---|---|---|
| RE32,187 E | 6/1986 | Barda et al. | 340/706 |
| 4,600,921 A | 7/1986 | Thomas | 340/825.31 |
| 4,633,297 A | 12/1986 | Skerlos et al. | 358/22 |
| 4,706,121 A | 11/1987 | Young | 358/142 |
| 4,712,239 A | 12/1987 | Frezza et al. | 380/20 |
| 4,734,764 A | 3/1988 | Pocock et al. | 358/86 |
| 4,739,318 A | 4/1988 | Cohen | 340/750 |
| 4,742,344 A | 5/1988 | Nakagawa et al. | 340/723 |
| 4,745,468 A | 5/1988 | Von Kohorn | 358/84 |
| 4,751,578 A | 6/1988 | Reiter et al. | 358/183 |
| 4,792,848 A | 12/1988 | Nussrallah et al. | 358/86 |
| 4,792,849 A | 12/1988 | McCalley et al. | 358/86 |
| 4,829,372 A | 5/1989 | McCalley et al. | 358/86 |
| 4,829,569 A | 5/1989 | Seth-Smith et al. | 380/10 |
| 4,847,825 A | 7/1989 | Levine | 369/47 |
| 4,860,123 A | 8/1989 | McCalley et al. | 358/342 |
| 4,866,770 A | 9/1989 | Seth-Smith et al. | 380/20 |
| 4,876,592 A | 10/1989 | Von Kohorn | 358/84 |
| 4,885,775 A | 12/1989 | Lucas | 380/10 |
| 4,890,321 A | 12/1989 | Seth-Smith et al. | 380/20 |
| 4,905,094 A | 2/1990 | Pocock et al. | 358/342 |
| 4,908,713 A | 3/1990 | Levine | 358/335 |
| 4,926,255 A | 5/1990 | Von Kohorn | 358/84 |
| 4,941,040 A | 7/1990 | Pocock et al. | 358/86 |
| 4,963,994 A | 10/1990 | Levine | 358/335 |
| 4,977,455 A | 12/1990 | Young | 358/142 |
| 4,991,011 A | 2/1991 | Johnson et al. | 358/141 |
| 4,994,908 A | 2/1991 | Kuban et al. | 358/86 |
| 5,014,125 A | 5/1991 | Pocock et al. | 358/86 |
| 5,034,807 A | 7/1991 | Von Kohorn | 358/84 |
| 5,038,211 A | 8/1991 | Hallenbeck | 358/142 |
| 5,057,915 A | 10/1991 | Von Kohorn | 358/84 |
| 5,058,160 A | 10/1991 | Banker et al. | 380/20 |
| 5,109,279 A | 4/1992 | Ando | 358/147 |
| 5,113,496 A | 5/1992 | McCalley et al. | |
| 5,119,188 A | 6/1992 | McCalley et al. | 358/86 |
| 5,123,046 A | 6/1992 | Levine | 380/10 |
| 5,128,752 A | 7/1992 | Von Kohorn | 358/84 |
| 5,146,210 A | 9/1992 | Heberle | 340/709 |
| 5,151,789 A | 9/1992 | Young | 358/194.1 |
| 5,191,410 A | 3/1993 | McCalley et al. | 358/86 |
| 5,195,092 A | 3/1993 | Wilson et al. | 370/94.2 |
| 5,208,665 A | 5/1993 | McCalley et al. | 358/86 |
| 5,227,874 A | 7/1993 | Von Kohorn | 358/84 |
| 5,231,665 A | 7/1993 | Auld et al. | 380/20 |
| 5,239,540 A | 8/1993 | Rovira et al. | 370/77 |
| 5,247,364 A | 9/1993 | Banker et al. | 358/191.1 |
| 5,249,044 A | 9/1993 | Von Kohorn | 358/86 |
| 5,260,778 A | 11/1993 | Kauffman et al. | 358/86 |
| 4,706,121 A | 12/1993 | Young | 358/142 |
| 5,270,809 A | 12/1993 | Gammie et al. | 358/84 |
| 5,283,734 A | 2/1994 | Von Kohorn | 364/412 |
| 5,293,357 A | 3/1994 | Hallenbeck | 348/734 |
| 5,297,204 A | 3/1994 | Levine | 380/10 |
| 5,301,028 A | 4/1994 | Banker et al. | 348/570 |
| 5,303,295 A | 4/1994 | West et al. | 380/10 |
| 5,307,173 A | 4/1994 | Yuen et al. | 358/335 |
| 5,319,454 A | 6/1994 | Schutte | 348/5.5 |
| 5,319,707 A | 6/1994 | Wasilewski et al. | 380/14 |
| 5,335,079 A | 8/1994 | Yuen et al. | 358/335 |
| 5,353,121 A | 10/1994 | Young et al. | 348/563 |
| 5,365,282 A | 11/1994 | Levine | 348/734 |
| 5,373,330 A | 12/1994 | Levine | 348/734 |
| 5,382,983 A | 1/1995 | Kwoh et al. | 348/716 |
| 5,400,401 A | 3/1995 | Wasilewski et al. | 380/9 |
| 5,406,558 A | 4/1995 | Rovira et al. | 370/77 |
| 5,414,448 A | 5/1995 | Wada et al. | 345/194 |
| 5,414,756 A | 5/1995 | Levine | 379/67 |
| 5,420,647 A | 5/1995 | Levine | 348/734 |
| 5,422,674 A | 6/1995 | Hooper et al. | 348/409 |
| 5,428,404 A | 6/1995 | Ingram et al. | 348/726 |
| 5,438,370 A | 8/1995 | Primiano et al. | 348/476 |
| 5,440,632 A | 8/1995 | Bacon et al. | 380/20 |
| 5,473,609 A | 12/1995 | Chaney | 370/94.1 |
| 5,473,704 A | 12/1995 | Abe | 382/235 |
| 5,475,382 A | 12/1995 | Yuen et al. | 340/825.72 |
| 5,477,262 A | 12/1995 | Banker et al. | 348/7 |
| 5,479,266 A | 12/1995 | Young et al. | 358/335 |
| 5,479,268 A | 12/1995 | Young et al. | 358/335 |
| 5,485,221 A | 1/1996 | Banker et al. | 348/563 |
| 5,488,409 A | 1/1996 | Yuen et al. | 348/5 |
| 5,493,339 A | 2/1996 | Birch et al. | 348/461 |
| 5,502,504 A | 3/1996 | Marshall et al. | 348/565 |
| 5,508,815 A | 4/1996 | Levine | 358/335 |
| 5,515,173 A | 5/1996 | Mankovitz et al. | 358/335 |
| 5,523,794 A | 6/1996 | Mankovitz et al. | 348/460 |
| 5,523,796 A | 6/1996 | Marshall et al. | 348/589 |
| 5,526,034 A | 6/1996 | Hoarty et al. | 348/7 |
| 5,532,732 A | 7/1996 | Yuen et al. | 348/1 |
| 5,532,754 A | 7/1996 | Young et al. | 348/569 |
| 5,539,391 A | 7/1996 | Yuen | 340/825.72 |
| 5,539,822 A | 7/1996 | Lett | 380/20 |
| 5,543,852 A | 8/1996 | Yuen et al. | 348/478 |
| 5,550,576 A | 8/1996 | Klosterman | 348/6 |
| 5,552,837 A | 9/1996 | Mankovitz | 348/734 |
| 5,553,123 A | 9/1996 | Chan et al. | 379/102 |
| 5,559,550 A | 9/1996 | Mankovitz | 348/6 |
| 5,559,870 A | 9/1996 | Patton et al. | 379/107 |
| 5,568,272 A | 10/1996 | Levine | 386/48 |
| 5,579,055 A | 11/1996 | Hamilton et al. | 348/476 |
| 5,579,057 A | 11/1996 | Banker et al. | 348/589 |
| 5,581,614 A | 12/1996 | Ng et al. | 380/20 |
| 5,592,551 A | 1/1997 | Lett et al. | 380/20 |
| 5,600,378 A | 2/1997 | Wasilewski et al. | 348/468 |
| 5,600,711 A | 2/1997 | Yuen | 379/102 |
| 5,604,528 A | 2/1997 | Edwards et al. | 348/5.5 |
| 5,619,247 A | 4/1997 | Russo | 348/3 |
| 5,619,274 A | 4/1997 | Roop et al. | 348/461 |
| 5,619,383 A | 4/1997 | Ngai | 360/20 |
| 5,621,579 A | 4/1997 | Yuen | 386/121 |
| 5,630,119 A * | 5/1997 | Aristides et al. | 707/1 |
| 5,642,153 A * | 6/1997 | Chaney et al. | 725/40 |
| 5,644,354 A | 7/1997 | Thompson et al. | 348/13 |
| 5,659,367 A | 8/1997 | Yuen | 348/465 |
| 5,673,089 A | 9/1997 | Yuen et al. | 604/95 |
| 5,675,575 A | 10/1997 | Wall, Jr. et al. | 370/326 |
| 5,684,525 A | 11/1997 | Klosterman | 348/12 |
| 5,692,214 A | 11/1997 | Levine | 395/833 |
| 5,701,383 A | 12/1997 | Russo et al. | 386/46 |
| 5,710,601 A | 1/1998 | Marshall et al. | 348/564 |
| 5,715,515 A | 2/1998 | Akins, III et al. | 455/4.1 |
| 5,716,273 A | 2/1998 | Yuen | 463/29 |
| 5,724,203 A | 3/1998 | Kwoh et al. | 360/72.3 |
| 5,724,525 A | 3/1998 | Beyers, II et al. | 395/240 |
| 5,727,060 A | 3/1998 | Young | 380/10 |
| 5,731,844 A | 3/1998 | Rauch et al. | 348/563 |
| 5,734,589 A | 3/1998 | Kostreski et al. | |
| 5,740,075 A | 4/1998 | Bigham et al. | 364/514 C |
| 5,751,282 A | 5/1998 | Girard et al. | 345/327 |
| 5,754,940 A | 5/1998 | Smith et al. | 455/5.1 |
| 5,757,416 A | 5/1998 | Birch et al. | 348/6 |
| 5,764,739 A | 6/1998 | Patton et al. | 379/106.03 |
| 5,771,064 A | 6/1998 | Lett | 348/10 |
| 5,790,198 A | 8/1998 | Roop et al. | 348/460 |
| 5,790,806 A | 8/1998 | Koperda | 395/200.82 |
| 5,801,753 A * | 9/1998 | Eyer et al. | 725/50 |
| 5,801,787 A | 9/1998 | Schein et al. | 348/569 |
| 5,805,204 A | 9/1998 | Thompson et al. | 348/13 |
| 5,808,608 A | 9/1998 | Young et al. | 345/327 |
| 5,809,204 A | 9/1998 | Young et al. | 386/83 |
| 5,812,205 A | 9/1998 | Milnes et al. | 348/460 |
| 5,828,420 A | 10/1998 | Marshall et al. | 348/564 |
| 5,828,945 A | 10/1998 | Klosterman | 455/4.2 |
| RE35,954 E | 11/1998 | Levine | 380/10 |

| | | | | |
|---|---|---|---|---|
| 5,844,620 A * | 12/1998 | Coleman et al. ............... 725/54 |
| 5,850,218 A | 12/1998 | Lajoie et al. ................. 345/327 |
| 5,852,478 A | 12/1998 | Kwoh ......................... 348/734 |
| 5,854,840 A | 12/1998 | Cannella, Jr. .................. 380/9 |
| 5,870,150 A | 2/1999 | Yuen .......................... 348/553 |
| 5,870,474 A | 2/1999 | Wasilewski et al. ........... 380/21 |
| 5,877,755 A | 3/1999 | Hellhake .................... 345/327 |
| 5,880,768 A | 3/1999 | Lemmons ...................... 348/1 |
| 5,915,068 A | 6/1999 | Levine ........................ 386/83 |
| 5,940,738 A | 8/1999 | Rao et al. |
| 5,949,476 A | 9/1999 | Pocock et al. ................. 348/24 |
| 5,999,970 A * | 12/1999 | Krisbergh et al. ............ 725/109 |
| 6,014,693 A | 1/2000 | Ito et al. ..................... 709/219 |
| 6,078,950 A | 6/2000 | Heidemann et al. ......... 709/217 |
| 6,198,478 B1 * | 3/2001 | Ota et al. .................... 715/716 |
| 6,522,672 B1 * | 2/2003 | Matsuzaki et al. .......... 370/539 |

FOREIGN PATENT DOCUMENTS

| | | |
|---|---|---|
| EP | 0 921 682 A | 6/1999 |
| EP | 0 946 060 A | 9/1999 |
| EP | 0940987 A2 * | 9/1999 |
| EP | 01 90 5040 | 3/2006 |
| WO | WO 98/31115 * | 7/1998 |
| WO | WO9831115 * | 7/1998 |

* cited by examiner

First Push Demandcast (Broadcast) Method

First Push Demandcast (Broadcast) Topology

Second Push Demandcast (Narrowcast) Method

Second Push Demandcast (Narrowcast) Topology

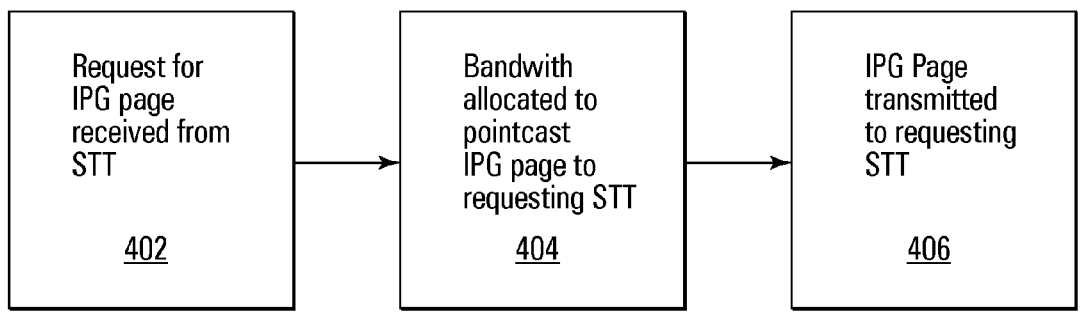
First Pull Demandcast (Pointcast) Method
FIG. 4A  ← 400
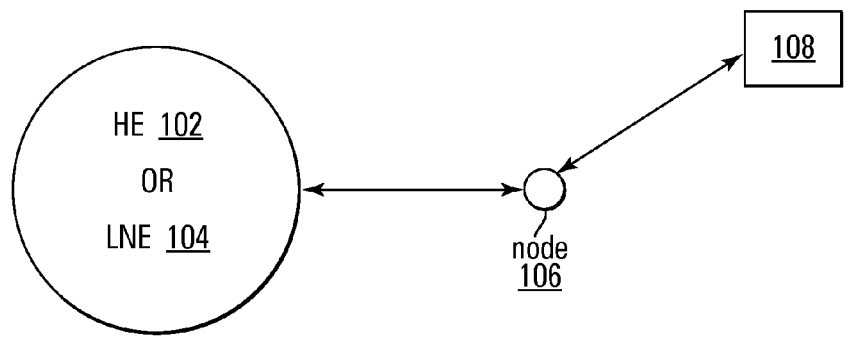
Pull Demandcast (Pointcast) Topology
FIG. 4B  ← 450

Second Pull Demandcast (Narrowcast) Method

Second Pull Demandcast (Narrowcast) Topology

Third Pull Demandcast (Pointcast Sharing) Method

Third Pull Demandcast (Pointcast Sharing) Topology

TSG to-Terminal Communication:

| Contents of Demand-Cast Index Table |
| --- |
| table version number (incremented when table content changes) |
| list of available demand-cast streams |
| IP address for the source TSG |
| MUX channel number within the source TSG |
| time of day and day of week |

FIG. 14

Terminal to-SM Communication:

| Message Content |
| --- |
| demand-cast stream ID |
| terminal ID |
| IP address for the source TSG |
| MUX channel number within the source TSG |
| message information (acquisition, release, or request) |

FIG. 15

SM to-TSG Communication:

| Message Content |
|---|
| demand-cast stream ID |
| MUX channel number within the source TSG |
| message/command (stream released, stream requested, or reset) |

FIG. 16

TSG to-SM Communication:

| Message Content |
|---|
| demand-cast stream ID |
| MUX channel number within the source TSG |
| IP address for the source TSG |
| acknowledgment (of stream release, of stream request, or of reset) |

FIG. 17

| A | A | A | A | R | R | R | R |
|---|---|---|---|---|---|---|---|
| A | A | A | A | R | R | R | R |
| A | A | A | A | R | R | R | R |
| A | A | A | R | R | R | R | P |
| A | A | A | R | R | R | R | P |

A: acquired streams are in mux and in demand-cast index table

R: released streams are in mux and in demand-cast index table. They can be turned into passive streams.

P: passive streams are technically released. They are not in the demand-cast index table. They are removable.

active demand-cast strreams are in IPG multiplex

TSG Demand-cast Stream Status

FIG. 18

DEMAND-CAST SYSTEM AND BANDWIDTH MANAGEMENT FOR DELIVERY OF INTERACTIVE PROGRAMMING

RELATED APPLICATIONS

The present application is based on U.S. Provisional Patent Application Ser. No. 60/178,100, filed Jan. 26, 2000, inventors Sadik Bayrakeri and Donald F. Gordon, and entitled "BANDWIDTH MANAGEMENT TECHNIQUES FOR DELIVERY OF INTERACTIVE PROGRAM GUIDE." The present application is a continuation-in-part of U.S. patent application Ser. No. 09/524,854, filed Mar. 14, 2000, now U.S. Pat. No. 7,127,737, inventors Sadik Bayrakeri, Donald F. Gordon, Edward A. Ludvig, Eugene Gershtein, Jeremy S. Edmonds, John P. Comito, and Alfred Li, and entitled "BANDWIDTH MANAGEMENT TECHNIQUES FOR DELIVERY OF INTERACTIVE PROGRAM GUIDE."

BACKGROUND OF THE INVENTION

1. Field of the Invention

The invention relates to communications systems in general. More specifically, the invention relates to video communications systems and interactive program guides for video programming.

2. Description of the Background Art

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two way set top terminals, or other methods of trying to offer service differentiated from standard cable and over the air broadcast systems.

With this increase in bandwidth, the number of programming choices has also increased. Leveraging off the availability of more intelligent set top terminals, several companies such as Starsight Telecast Inc. and TV Guide, Inc. have developed elaborate systems for providing an interactive listing of a vast array of channel offerings, expanded textual information about individual programs, the ability to look forward to plan television viewing as much as several weeks in advance, and the option of automatically programming a VCR to record a future broadcast of a television program.

Unfortunately, the existing program guides have several drawbacks. They tend to require a significant amount of memory, some of them needing upwards of one megabyte of memory at the set top terminal (STT). They are very slow to acquire their current database of programming information when they are turned on for the first time or are subsequently restarted (e.g., a large database may be downloaded to a STT using only a vertical blanking interval (VBI) data insertion technique). Disadvantageously, such slow database acquisition may result in out of date database information or, in the case of a pay per view (PPV) or video on demand (VOD) system, limited scheduling flexibility for the information provider.

The use of compression techniques to reduce the amount of data to be transmitted may increase the speed of transmitting program guide information. In several communications systems, the data to be transmitted is compressed so that the available transmission bandwidth is used more efficiently.

For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is also incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable rate digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

However, the MPEG-1 and MPEG-2 standards have, in some instances, very strict elementary stream and transport stream formats, causing usage of extra bandwidth for certain applications. For example, if a number of interactive program guide (IPG) pages were created as video sequences, only limited number of pages could be encoded into a transport stream(s) at a specified bandwidth.

Therefore, it is desirable to provide techniques for more efficiently utilizing a limited and finite bandwidth for transmitting program guide video sequences to set-top terminals.

SUMMARY OF THE INVENTION

The present invention provides a system for more efficient utilization of the finite bandwidth available for distribution of interactive program guide (IPG) video sequences. The system utilizes a session manager and a transport stream generator to enable a set top terminal to access an entire array of guide pages from the IPG within the constraints imposed by the limited bandwidth available in the distribution network.

One embodiment of the present invention comprises a system that includes a session manager (SM) and a transport stream generator (TSG) within a distribution control center. The SM monitors and controls usage of demand-cast stream bandwidth within the distribution network. The TSG receives information from the SM on each demand-cast stream. The information includes which set top terminals, if any, are currently acquiring the stream. The TSG uses the information to control the demand-cast streams multiplexed into the transport stream for distribution to the set top terminals.

BRIEF DESCRIPTION OF THE DRAWINGS

The teachings of the present invention can be readily understood by considering the following detailed description in conjunction with the accompanying drawings.

FIGS. 2-6 depicts various methods and topologies for demand-casting interactive program guide (IPG) pages in accordance with embodiments of the present invention.

FIG. 4A is a flow chart showing a first pull method 400 for demand-casting IPG pages in accordance with an embodiment of the present invention.

FIG. 4B depicts a first pull topology 450 for demand-casting IPG pages in accordance with an embodiment of the present invention.

FIG. 14 depicts an embodiment for the content of the demand-cast index table.

FIG. 15 depicts one embodiment for the contents of the messages sent from the terminal 706 to the SM 702.

FIG. 16 depicts one embodiment for the contents of the messages sent from the SM 702 to the TSG 704.

FIG. 17 depicts one embodiment for the contents of the acknowledgement messages sent by the TSG 704 back to the SM 702.

FIG. 18 depicts an example showing status of active demand-cast streams in an IPG multiplex.

DESCRIPTION OF THE SPECIFIC EMBODIMENTS

I. Illustrative Communications Network

Figure 1:
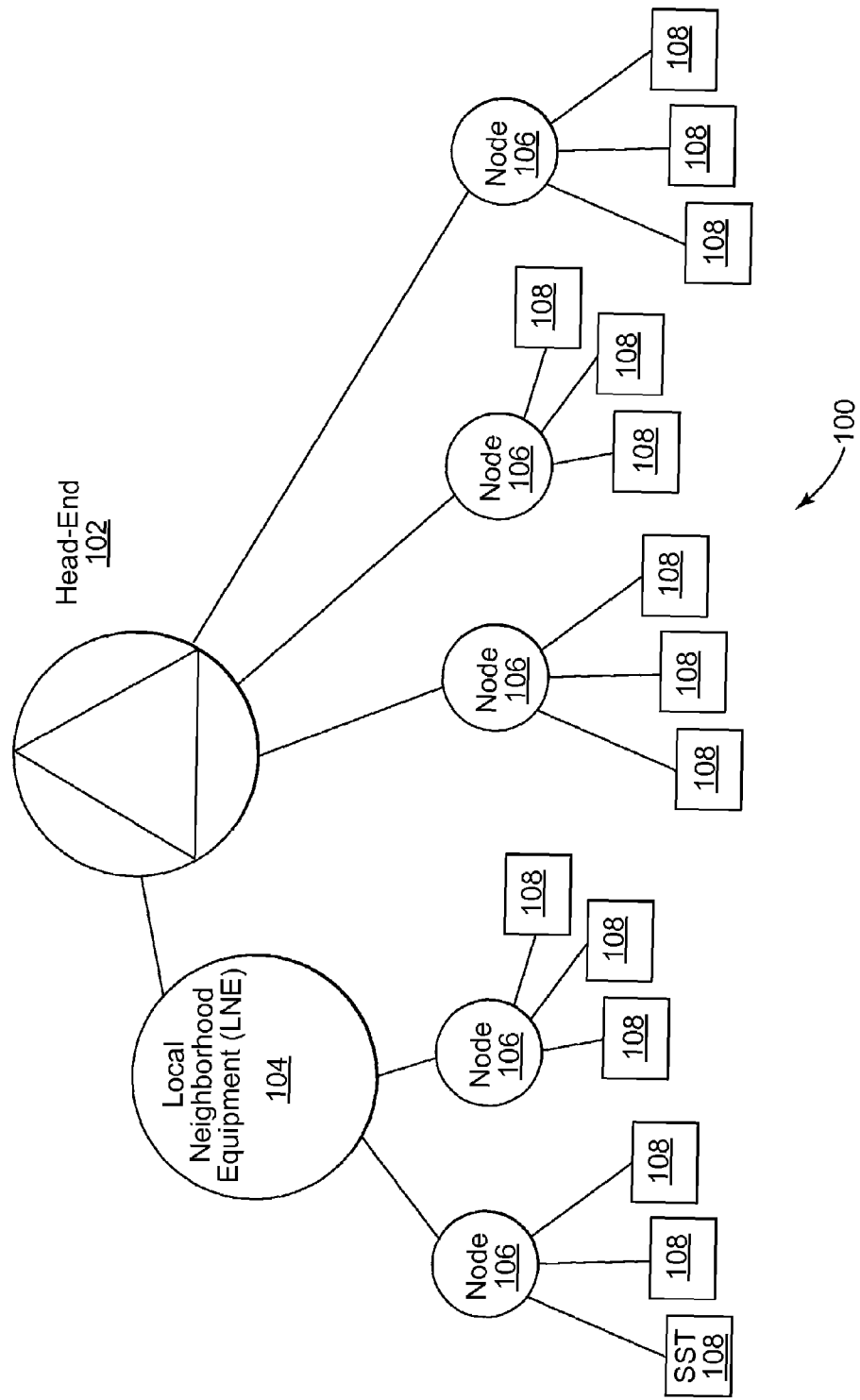
FIG. 1 depicts an illustrative communications network 100 for distributing video sequences to a plurality of terminals in accordance with an embodiment of the present invention.

FIG. 1 depicts an illustrative communications network 100 for distributing video sequences to a plurality of terminals in accordance with an embodiment of the present invention. The illustrative network 100 comprises a cable distribution network, but other types of distribution networks may also be used within the spirit and scope of the present invention.

The illustrative network 100 includes one or more head-ends 102, one or more centers for local neighborhood equipment 104, a plurality of distribution nodes 106, and a plurality of subscriber stations 108. The local neighborhood equipment (LNE) 104 may be located, for example, at remote hubs of a cable distribution network. The end-user terminals 108 may comprise, for example, interactive set-top terminals (STT) or other devices with similar interactive functionalities.

II. Example Methods and Topologies

In the present application, the demand-cast term is used to refer to the process of managing and delivering content to one or more users depending on user demand for the content. FIGS. 2-6 depicts various methods and topologies for demand-casting interactive program guide (IPG) pages. The various methods/topologies are given for purposes of edification and are not meant to limit the scope of the present invention.

Figure 2A:
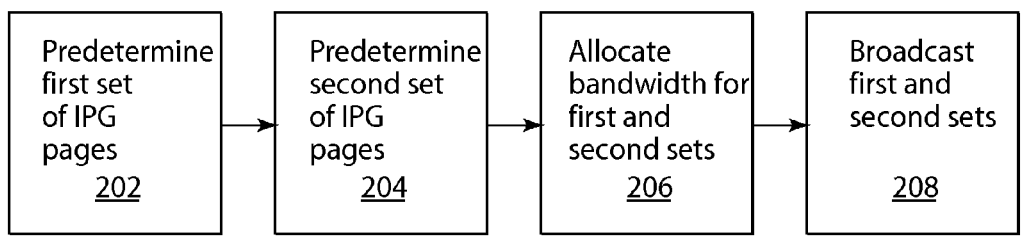
FIG. 2A is a flow chart showing a first push method 200 for demand-casting interactive program guide (IPG) pages in accordance with an embodiment of the present invention.

FIG. 2A is a flow chart showing a first push method 200 for demand-casting interactive program guide (IPG) pages in accordance with an embodiment of the present invention. As described below, the method 200 includes four steps.

In a first step 202, a first set of IPG pages to be broadcast are predetermined. The first set of IPG pages may comprise video sequences, for example, for a current time period. For instance, if the current time is 1:07 pm, then the current time period may include programming from 1:00 pm to 2:30 pm, assuming a 90 minute time period.

In a second step 204, a second set of IPG pages to be broadcast are predetermined. The second set of IPG pages may comprise video sequences, for example, for a prime time period. Such a prime time period is a time period during which a large number of viewers typically watch TV programming. For example, the prime time period may include programming from 6:00 pm to 9:00 pm.

In a third step 206, bandwidth to broadcast the first and second sets of IPG pages is allocated in the distribution system for that purpose. For example, as described below in more detail, a bandwidth manager (BWM) within a head-end 102 and/or local neighborhood equipment 104 allocates within the in-band network the necessary bandwidth to broadcast the first and second sets of IPG pages to the set-top terminals (STT) 108. If the first and second sets overlap, then only the non-redundant video sequences need to be broadcast and so only enough bandwidth to broadcast the non-redundant video sequences needs to be allocated. Such a situation may happen, for example, when the current time period is within prime time.

In a fourth step 208, the IPG pages of the first and second sets are broadcast to set-top terminals (STT) 108 within the broadcast range. The broadcast range may comprise all terminals 108 downstream from the head-end 102 or local neighborhood equipment 104. Only the non-redundant content needs to be broadcast. The broadcast is performed within the allocated in-band bandwidth.

Figure 2B:
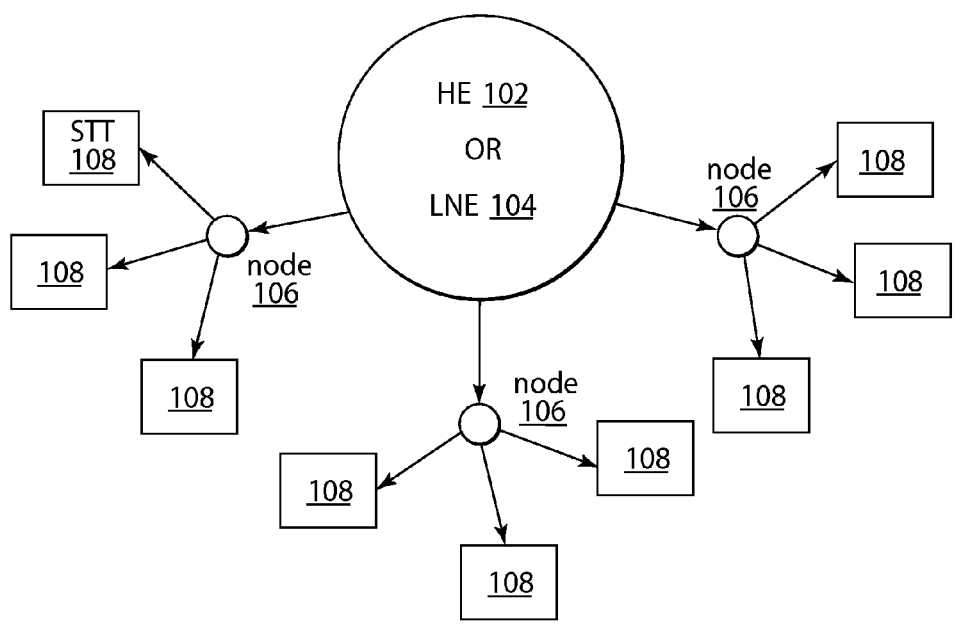
FIG. 2B depicts a first push topology 250 for demand-casting IPG pages in accordance with an embodiment of the present invention.

FIG. 2B depicts a first push topology 250 for demand-casting IPG pages in accordance with an embodiment of the present invention. The topology 250 relates to the push method 200 of FIG. 2A. As shown in FIG. 2B, the IPG pages are transmitted from the head-end (HE) 102 or local neighborhood equipment (LNE) 104 downstream within the illustrative communications network 100. As shown in FIG. 2B, the broadcast is pushed from the HE 102 or LNE 104 to the distribution nodes 106 and finally to the multitude of set-top terminals 108.

Figure 3A:
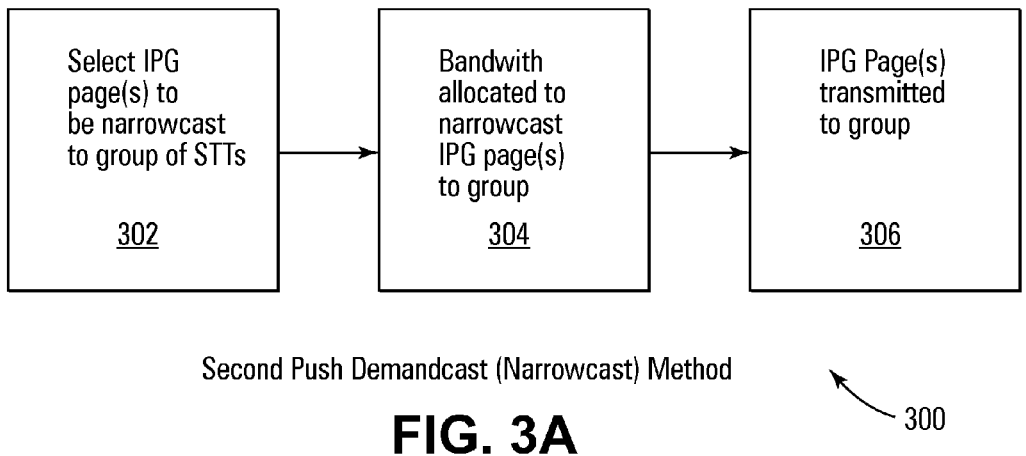
FIG. 3A is a flow chart showing a second push method 300 for demand-casting IPG pages in accordance with an embodiment of the present invention.

FIG. 3A is a flow chart showing a second push method 300 for demand-casting IPG pages in accordance with an embodiment of the present invention. As described below, the method 300 includes three steps.

In a first step 302, an IPG page is selected to be narrowcast to a group 352 of terminals 108. For example, the group of terminals may be a group comprising a high concentration of users with a particular ethnicity or special interest, and the IPG page selected may comprise programming targeted to that ethnic group or special interest group. As another example, the group of terminals may comprise terminals 108 in a school campus or business, and the IPG page selected may comprise class instruction or other targeted material. The group 352 may include terminals 108 in one geographic area or terminals 108 dispersed among different geographic areas but linked, for example, via a network group address.

In a second step 304, bandwidth to narrowcast the selected IPG pages is allocated in the distribution system for that purpose. For example, as described below in more detail, a bandwidth manager (BWM) within a head-end 102 and/or local neighborhood equipment 104 allocates within the in-band network the necessary bandwidth to narrowcast the selected IPG page to the group 352 of terminals 108. If the requested IPG page is already being broadcast per FIGS. 2A and 2B, then no additional bandwidth for a narrowcast need be allocated.

In a third step 306, the selected IPG page is narrowcast to the group of terminals 108. The narrowcast need only be received by terminals 108 within the group 352 and does not need to be received by other STTs 108. The narrowcast is sent downstream from the head-end 102 or local neighborhood equipment 104 to the group 352 of terminals 108. The narrowcast is performed within the allocated in-band bandwidth. If the requested IPG page is already being broadcast per FIGS. 2A and 2B, then the narrowcast need not be performed.

Figure 3B:
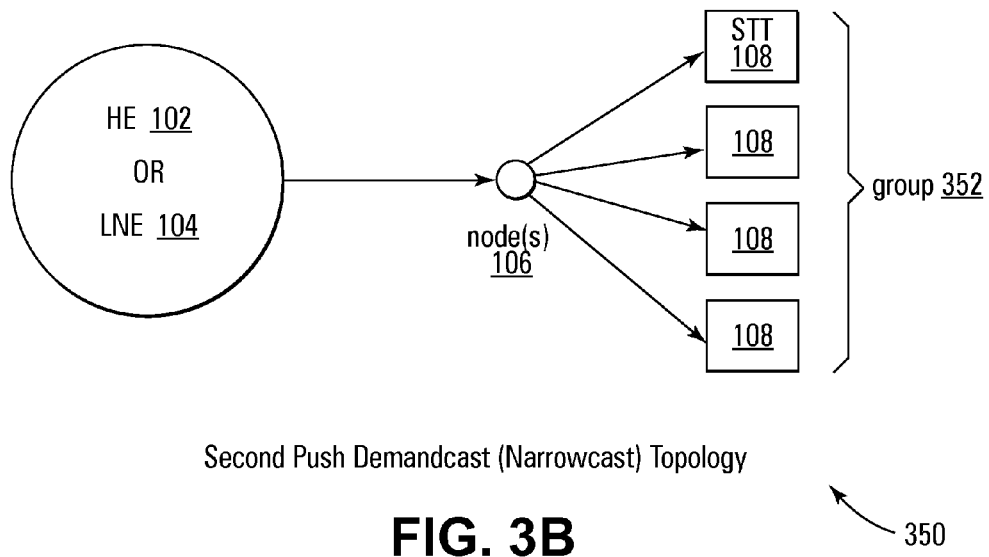
FIG. 3B depicts a second push topology 350 for demand-casting IPG pages in accordance with an embodiment of the present invention.

FIG. 3B depicts a second push topology 350 for demand-casting IPG pages in accordance with an embodiment of the present invention. The topology 350 relates to the push method 300 of FIG. 3A. As shown in FIG. 3B, the IPG page is transmitted from the head-end (HE) 102 or local neighborhood equipment (LNE) 104 downstream within the illustrative communications network 100. As shown in FIG. 3B, the narrowcast is pushed from the HE 102 or LNE 104 to one or more distribution nodes 106 and finally to the terminals 108 within the group 352.

FIG. 4A is a flow chart showing a first pull method 400 for demand-casting IPG pages in accordance with an embodiment of the present invention. As described below, the method 400 includes three steps.

In a first step 402, a request for an IPG page is received from a STT 108. The request is transmitted upstream from the STT 108 to the HE 102 or LNE 104 by way of the communications network 100. The upstream transmission may be done via an out-of-band network. Alternatively, the upstream transmission may be done via an in-band network. Such a request may comprise, for example, a look ahead request where a user wishes to view programming for a time period ahead of the current time period. For a system where a set or sets of IPG pages are already being broadcast per FIGS. 2A and 2B, the STT 108 may first check to see whether or not the requested IPG page is already being broadcast before transmitting the request upstream.

In a second step 404, bandwidth to pointcast the requested IPG page is allocated in the distribution system for that purpose. For example, as described in more detail below, a bandwidth manager (BWM) within a head-end 102 and/or local neighborhood equipment 104 may allocate within the in-band network the necessary bandwidth to pointcast the requested IPG page to the requesting STT 108. Such allocation is performed if sufficient system resources are available to establish such a session. Moreover, if the requested IPG page is already being broadcast per FIGS. 2A and 2B, then no additional bandwidth for a pointcast need be allocated.

In a third step 406, the requested IPG page is pointcast to the requesting set-top terminal (STT) 108. The pointcast need only be received by the requesting STT 108 and does not need to be received by other STTs 108. The pointcast is sent downstream from the head-end 102 or local neighborhood equipment 104 to the requesting STT 108. The pointcast is performed within the allocated in-band bandwidth. If the requested IPG page is already being broadcast per FIGS. 2A and 2B, then the pointcast need not be performed.

FIG. 4B depicts a first pull topology 450 for demand-casting IPG pages in accordance with an embodiment of the present invention. The topology 450 relates to the pull method 400 of FIG. 4A. As shown in FIG. 4B, the request is transmitted upstream from the requesting STT 108 to the HE 102 or LNE 104 via illustrative communications network 100. Subsequently, the requested IPG page is pointcast downstream from the HE 102 or LNE 104 to the requesting STT 108 via the network 100.

Figure 5A:
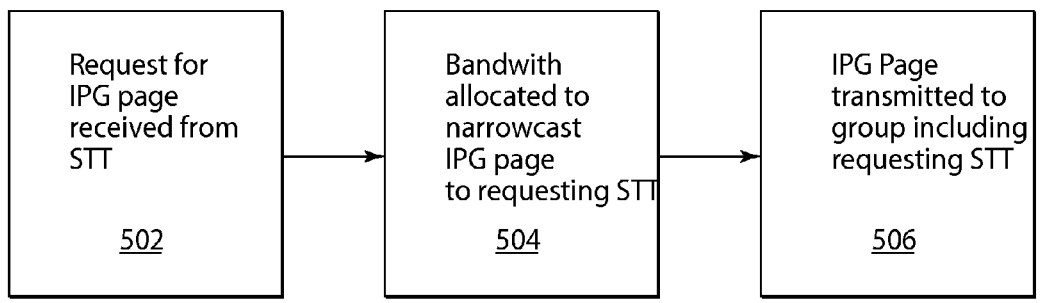
FIG. 5A is a flow chart showing a second pull method 500 for demand-casting IPG pages in accordance with an embodiment of the present invention.

FIG. 5A is a flow chart showing a second pull method 500 for demand-casting IPG pages in accordance with an embodiment of the present invention. As described below, the method 500 includes three steps.

In a first step 502, a request for an IPG page is received from a requesting STT 552. The request is transmitted upstream from the requesting STT 552 to the HE 102 or LNE 104 by way of the communications network 100. The upstream transmission may be done via an out-of-band network. Alternatively, the upstream transmission may be done via an in-band network. Such a request may comprise, for example, a look ahead request where a user wishes to view available special interest programming for a time period ahead of the current time period. For a system where a set or sets of IPG pages are already being broadcast per FIGS. 2A and 2B, the requesting STT 552 may first check to see whether or not the requested IPG page is already being broadcast before transmitting the request upstream.

In a second step 504, bandwidth to narrowcast the requested IPG page is allocated in the distribution system for that purpose. For example, as described below in relation to FIGS. 7 and 8, a bandwidth manager (BWM) within a head-end 102 and/or local neighborhood equipment 104 may allocate within the in-band network the necessary bandwidth to narrowcast the requested IPG page to a group 554 of terminals which includes the requesting STT 552. Such allocation is performed if sufficient system resources are available to establish such a session. If the requested IPG page is already being broadcast per FIGS. 2A and 2B, then no additional bandwidth for a pointcast need be allocated. The group 554 may include terminals 108 in one geographic area or terminals 108 dispersed among different geographic areas but linked, for example, via a network group address.

In a third step 506, the requested IPG page is narrowcast to the group 554 of terminals 108. The narrowcast need only be received by terminals 108 within the group 554 and does not need to be received by other STTs 108. The narrowcast is sent downstream from the head-end 102 or local neighborhood equipment 104 to the group 554 of terminals 108. The narrowcast is performed within the allocated in-band bandwidth. If the requested IPG page is already being broadcast per FIGS. 2A and 2B, then the narrowcast need not be performed.

Figure 5B:
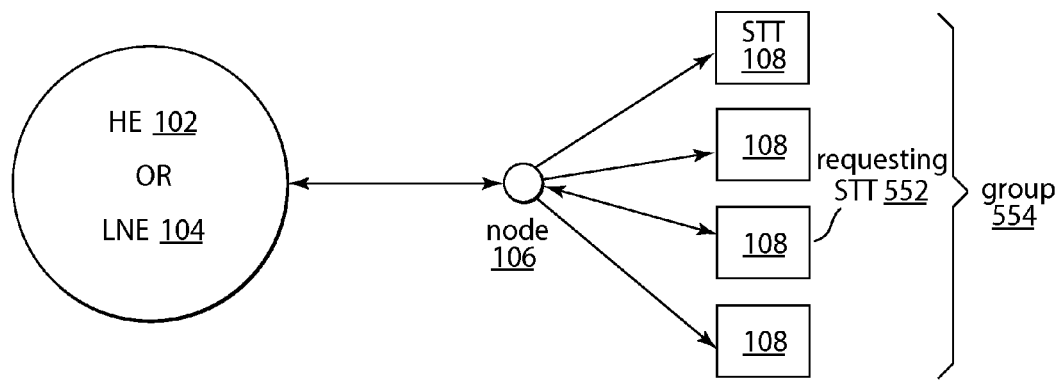
FIG. 5B depicts a second pull topology 550 for demand-casting IPG pages in accordance with an embodiment of the present invention.

FIG. 5B depicts a second pull topology 550 for demand-casting IPG pages in accordance with an embodiment of the present invention. The topology 550 relates to the pull method 500 of FIG. 5A. As shown in FIG. 5B, the request is transmitted upstream from the requesting STT 552 to the HE 102 or LNE 104 via illustrative communications network 100. Subsequently, the requested IPG page is narrowcast downstream from the HE 102 or LNE 104 to the group 554 which includes the requesting STT 108 via the network 100.

Figure 6A:
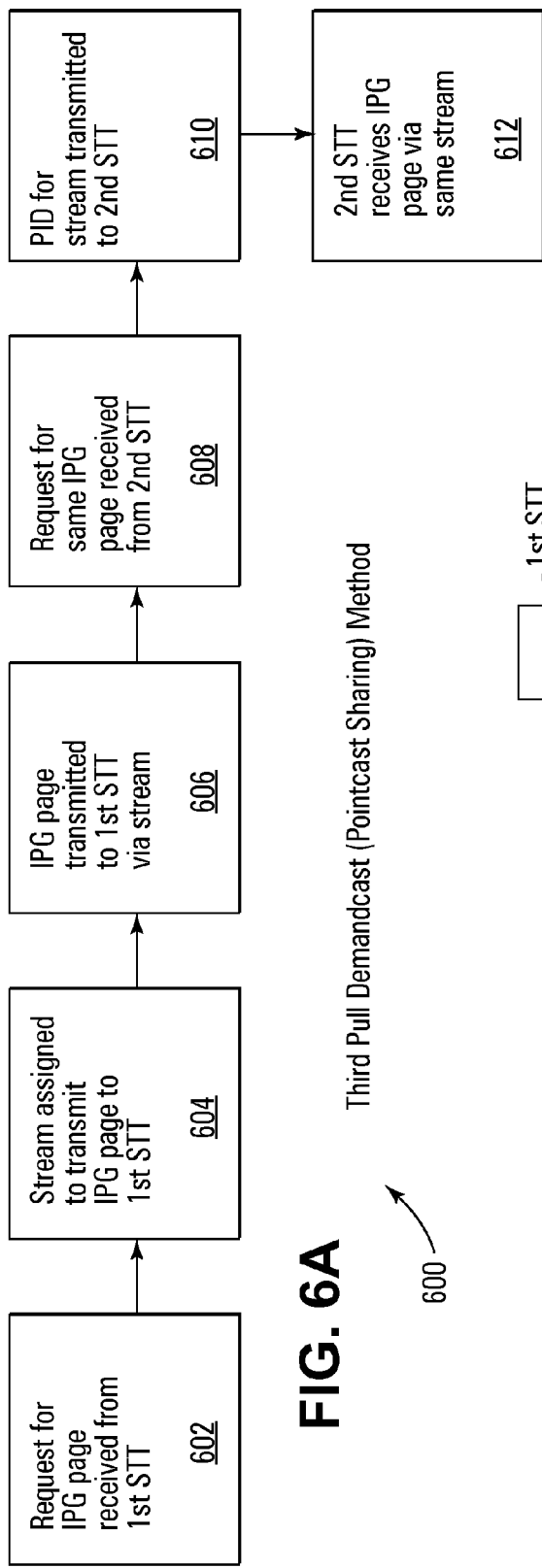
FIG. 6A is a flow chart showing a third pull method 600 for demand-casting of IPG pages in accordance with an embodiment of the present invention.

FIG. 6A is a flow chart showing a third pull method 600 for demand-casting of IPG pages in accordance with an embodiment of the present invention. As described below, the method 600 includes five steps.

In a first step 602, a request for an IPG page is received from a first STT 652. The request is transmitted upstream from the first STT 652 to the HE 102 or LNE 104 by way of the communications network 100. The upstream transmission may be done via an out-of-band network. Alternatively, the upstream transmission may be done via an in-band network. Such a request may comprise, for example, a look ahead request where a user wishes to view programming for a time period ahead of the current time period. For a system where a set or sets of IPG pages are already being broadcast per FIGS. 2A and 2B, the first STT 652 may first check to see whether or not the requested IPG page is already being broadcast before transmitting the request upstream.

In a second step 604, a stream 656 assigned to pointcast the requested IPG page may be allocated in the distribution system for that purpose. Such allocation is performed if sufficient system resources are available to establish such a session. For example, as described below in more detail, a bandwidth manager (BWM) within a head-end 102 and/or local neighborhood equipment 104 may determine that sufficient resources are available to assign the stream 656 to pointcast the requested IPG page to the first STT 652. The stream assignment may be made, for example, by assigning a particular value to the program identifier (PID) for the stream 656. If the requested IPG page is already being broadcast per FIGS. 2A and 2B, then the stream assignment need not be made.

In a third step 606, the requested IPG page is pointcast to the first STT 652 via the assigned stream 656. This may be done by transmitting packets that are identified by the particular PID value and contain the video sequence of the requested IPG page. The pointcast need only be received by the first STT 652 and does not need to be received by other STTs 108. The pointcast is sent downstream from the head-end 102 or local neighborhood equipment 104 to the first STT 652. If the requested IPG page is already being broadcast per FIGS. 2A and 2B, then the pointcast need not be performed.

In a fourth step 608, a request for an IPG page is received from a second STT 654, where the IPG page requested is the same IPG page as the one requested by the first STT 652 in the first step 602. Like the first request, this second request is transmitted upstream from the second STT 654 to the HE 102 or LNE 104 by way of the communications network 100 via either an out-of-band network or via an in-band network. The second STT 654 may be either in the same geographic area as the first STT 652, or the second STT 654 may be in a different geographic area as the first STT 652.

Either way, in a fifth step 610, the identifier (e.g., PID value) for the stream 656 is transmitted from the HE 102 or LNE 104 to the second STT 654. This enables the next step 612 to occur without use of additional PIDs or additional network bandwidth.

Finally, in a sixth step 612, the second STT 654 receives the requested IPG page via the same stream 656 as that which delivers the IPG page to the first STT 652. This may be done, for example, by setting the second STT 654 to decode and present packets that are identified by the particular PID value for the stream 656. Such packets are the ones which contain the video sequence of the requested IPG page. In this manner, "sharing" of the stream 656 occurs, changing the previously "single" pointcast to a "double" pointcast.

Similarly, additional terminals 108 may "share" the pointcast by requesting the same IPG page and receiving it via the same stream 656. In this way, any number of terminals 108 may share the pointcast. This results in more efficient use of limited bandwidth.

Figure 6B:
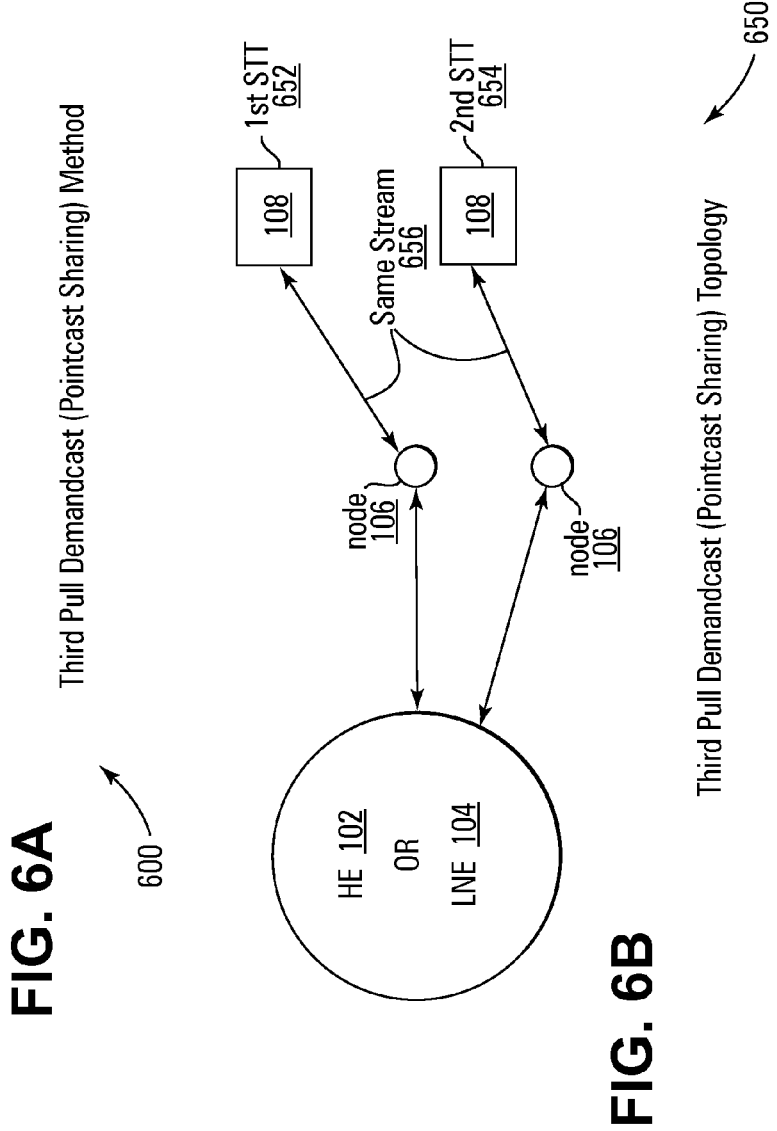
FIG. 6B depicts a third pull topology 650 for demand-casting of IPG pages in accordance with an embodiment of the present invention.

FIG. 6B depicts a third pull topology 650 for demand-casting of IPG pages in accordance with an embodiment of the present invention. The topology 650 relates to the pointcast "sharing" method 600 of FIG. 6A. As shown in FIG. 6B, a request is transmitted upstream from the first STT 652 to the HE 102 or LNE 104 via illustrative communications network 100. In response, the requested IPG page is pointcast by way of a stream 656 from the HE 102 or LNE 104 to the first STT 652. Next, a second request for the same IPG page is transmitted upstream from the second STT 654 to the HE 102 or LNE 104 via the network 100. In response, the identifier for the stream 656 is transmitted from the HE 102 or LNE 104 to the second STT 654. Subsequently, the second STT 654 uses the identifier to receive the IPG page from that same stream 656.

Figure 6C:
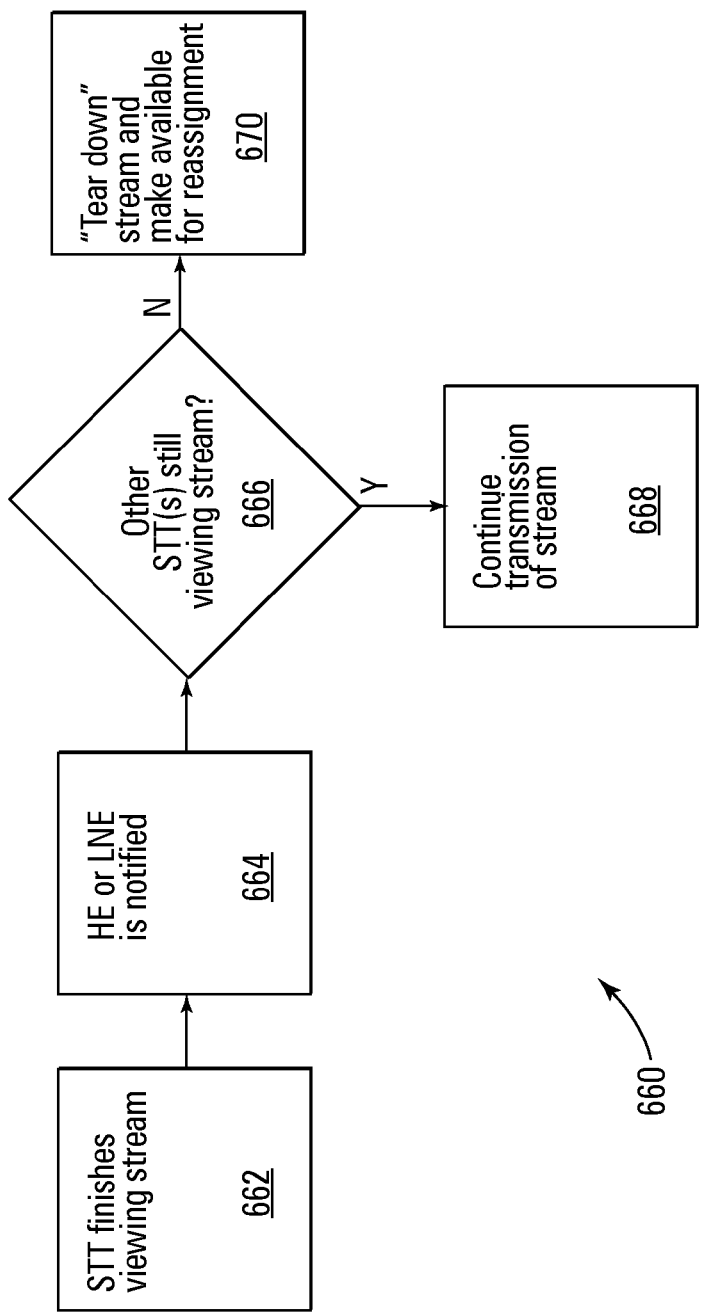
FIG. 6C is a flow chart showing a method 660 of terminating (or continuing) demand-casts in accordance with the third pull method 600.

FIG. 6C is a flow chart showing a method 660 of terminating (or continuing) demand-casts in accordance with the third pull method 600. As described below, the method 660 includes five steps.

In a first step 662, an STT finishes viewing a stream which transmits an IPG page. In the example discussed above with respect to FIGS. 6A and 6B, the STT may be either the first STT 652 or the second STT 654. In general, the STT may be any of multiple terminals which are sharing the stream, or the STT may be the last terminal to be viewing a stream which was previously shared.

In a second step 664, the HE 102 or LNE 104 is notified that the STT has finished viewing the stream. Such a notification occurs by the STT sending a communication upstream to the HE 102 or LNE 104 by way of an out-of-band or in-band network.

In a third step 666, a determination is made as to whether or not that stream is still being viewed by one or more STTs. As described in more detail below, this determination is done within the HE 102 or LNE 104 and may be done by a bandwidth manager in conjunction with a session manager.

In a fourth step 668, if one or more STTs are still viewing that stream, then transmission of the stream by the HE 102 or LNE 104 continues. Such transmission is typically performed by an in-band delivery system.

Finally, in a fifth step 670, if no more STTs are still viewing that stream, then the stream is "torn down" so that it is no longer transmitted and no longer takes up network bandwidth. The torn down stream is made available for reassignment to reuse the bandwidth to transmit a different pointcast, narrowcast, or broadcast.

III. Demand-Cast System

1. Guide Page Usage Frequency Distribution

Prerequisite assumptions need to be made regarding the usage frequency distribution of guide pages. Certain pages in the guide page matrix, such as those in the current time slot and adjacent time slots (near look-ahead) are likely to be accessed frequently by STT users. Similarly, other guide pages, as in the case of "far look-ahead" pages, are likely to be accessed less frequently. This characteristic, inherent in guide page usage, lends the IPG well to a demand-cast model described in this document. Access to all the guide pages in the guide page matrix can be made possible by sending in the transport a combination of constantly broadcast guide pages for those pages that are most frequently accessed, and temporarily broadcast or demand-cast guide pages for those less frequently accessed. The technique consists in sending current and near look-ahead pages in broadcast fashion and sending far look-ahead pages in demand-cast fashion.

2. Demand-Cast Overview

A demand-cast IPG system is a two-way system requiring communication between STT users on the cable network and the head-end via a back-channel. Demand-cast pages are inserted in the transport stream for temporary broadcast based on access demand generated by STT users on the cable network. When a request for a guide page is made by a particular STT, two things can happen. If the page is already in the IPG broadcast, the STT simply acquires the corresponding stream. If the page is not in the broadcast, the STT requests from the head-end that the corresponding stream be inserted in the IPG multiplex. The head-end replaces the least frequently accessed and not currently accessed stream in the IPG multiplex with the newly requested page. When a STT no longer accesses a guide page, it informs the head-end that it has released it. When accessing a demand-cast page, the IPG STT application also times-out following a certain delay of inactivity (i.e. 2 minutes) on the part of the user. In this case it also informs the head-end that it has released the page. Informing the head-end when demand-cast pages become released ensures that non-accessed demand-cast pages become available for substitution. When a STT requests that a new demand-cast page be inserted into the IPG multiplex, if there is no slot available in the IPG multiplex, the head-end refuses to insert a newly requested guide page resulting in a blockage. All statistical systems are susceptible to blockage if loaded with too many users or in the case of rare chaotic episodes. The advantage of the demand-cast model is that if a particular page is susceptible to intensive access, such as in the case of a page listing a major sports event, it only needs to be inserted once into the transport stream. It is readily accessible by multiple STTs without consuming additional bandwidth.

3. Latency in Broadcast Vs. Demand-Cast

Access to guide pages with low latency is an important feature in the IPG. Constantly broadcast pages offer the lowest latency access, whereas demand-cast pages may be delayed if not yet in the transport stream. Frequently accessed pages, such as those in the current time slot and near look-ahead time slots, and perhaps prime-time slots need to be broadcast constantly so as to remain accessible with the minimum of latency. Less frequently accessed far look-ahead pages can be demand-cast.

4. System Description

Figure 7:
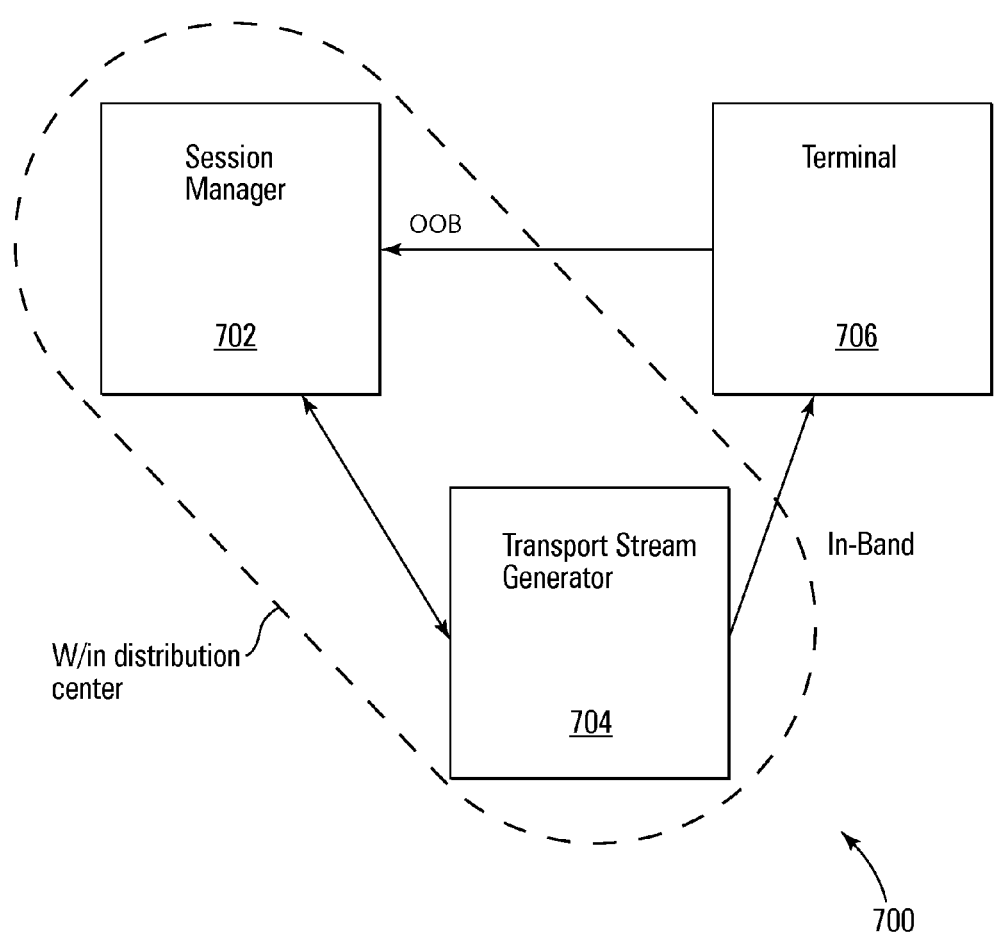
FIG. 7 depicts a two-way system 700 for efficient delivery of demand-cast video sequences in accordance with an embodiment of the present invention.

FIG. 7 depicts a two-way system 700 for efficient delivery of demand-cast video sequences in accordance with an embodiment of the present invention. The system 700 includes a session manager (SM) 702 and a transport stream generator (TSG) 704.

Both the SM 702 and the TSG 704 may be, for example, co-located at a distribution center. The distribution center may comprise, for example, a headend 102 in the illustrative distribution system 100. Alternatively, the SM 702 and the TSG 704 may be at different locations. For example, the SM 702 may be at a headend 102, and the TSG 704 may be at local neighborhood equipment 104 in the illustrative distribution system 100.

Both the SM 702 and the TSG 704 are coupled to a plurality of terminals 706 via a distribution network. The distribution network may comprise, for example, the cable distribution network 100 illustrated in FIG. 1. In that example, the terminals 706 would comprise set-top terminals 108 or the equivalent functionality integrated into a computer system or advanced television. Alternatively, for example, the distribution network may comprise a satellite communications system or another type of communications system (telephonic, wireless, etc.).

Figure 10:
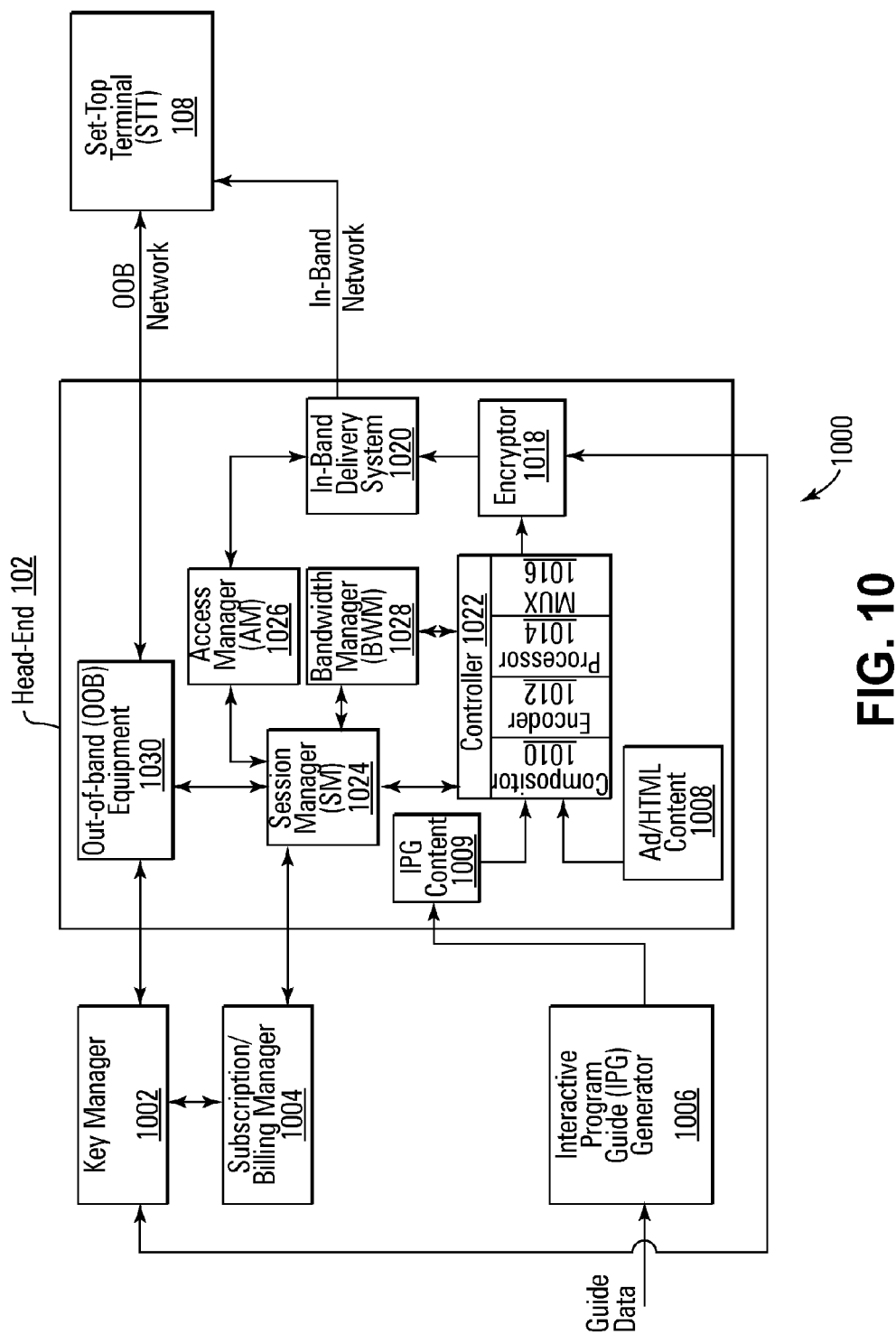
FIG. 10 depicts a first implementational architecture 1000 for managing delivery of video sequences of an interactive program guide in accordance with an embodiment of the present invention.

One terminal 706 and its links to the SM 702 and the TSG 704 are illustrated in FIG. 10. In the particular embodiment shown in FIG. 10, the terminal 706 receives in-band communications from the TSG 704 and sends out-of-band (OOB) communications to the SM 702. In an alternative embodiment, the communications to the SM 702 may comprise upstream in-band communications.

The session manager (SM) 702 may comprise, in one embodiment, a computer system residing at a cable headend 102. The computer system may comprise, for example, a computer server running a version of the UNIX (or alternatively Windows) operating system. The computer system may receive out-of-band communications from the terminals 706 by way of a connection to the network controller. For example, the connection may comprise an Ethernet connection, and the network controller may comprise one from General Instruments (now part of Motorola) or another supplier. The computer system also communicates with and controls the transport stream generator 704 by way of a network connection such as an Ethernet connection.

The SM 702 manages delivery of the IPG to terminals 706 on multiple cable nodes each served by a separate IPG multiplexed transport stream generated at a TSG 704. The SM 702 also monitors demand-cast stream usage by the terminals 706. It tracks IPG demand-cast streams that are acquired by at least one terminal 706 by maintaining a dynamic list of terminals 706 using each stream. This is done for each IPG multiplexed transport stream managed by the SM 702. The SM 702 also accepts messages from terminals 706 indicating that they have acquired, released, or requested demand-cast streams. A terminal 706 that has acquired a demand-cast stream is registered to the stream, and a terminal 706 that has released a demand-cast stream is removed from the registry for the stream. The SM 702 informs the corresponding TSG 704 once there is no longer any terminals 706 registered to a particular demand-cast stream. It also informs the TSG 704 when a terminal 706 requests a demand-cast stream. In one embodiment, the SM 702 may time-out acquisition of a stream by any terminal 706 if the terminal 706 has not released the stream within a period of time (for example, a few minutes). The time-out may be implemented by removing the particular terminal 706 from the registry for the stream.

The transport stream generator (TSG) 704 may comprise, in one embodiment, a computer system residing at a cable headend 102. The computer system may comprise, for example, a computer server running a version of the Windows (or alternatively UNIX) operating system. Alternatively, the TSG 704 may be located separately from the SM 702, for example, at local neighborhood equipment 104. Each TSG 704 is coupled to a SM 702, for example, via an Ethernet network. The TSG 704 may generate one or more IPG multiplexed transport stream, each broadcast to a respective node in the distribution system.

In one embodiment, the IPG multiplexed transport stream comprises a MPEG transport stream. In this case, the TSG 704 may communicate with the terminals 706 by way of tables in the private section of the MPEG transport stream. Such a table may include a list of available demand-cast streams, along with the address of the source TSG 704 and information to identify the particular IPG multiplexed transport stream to which the table belongs.

The TSG 704 manages each IPG multiplexed transport stream which it generates. The TSG 704 receives information from the SM 702 indicating whether each demand-cast stream being served is currently being acquired by any terminal 706 or not. In other words, the TSG 704 is informed by the SM 702 when there is no longer any terminals 706 acquiring a demand-cast stream.

In one embodiment, the TSG 704 maintains a status for each variable demand-cast stream being served. The status is adjusted upon receipt by the TSG 704 of certain messages from the SM 702. The basic states for the status comprise an "acquired" state which denotes that the demand-cast stream is in use by one or more terminals 706, and a "released" state which denotes that that the demand-cast stream is not in use by any terminal 706. The TSG 704 keeps serving "acquired" demand-cast streams by multiplexing them into appropriate transport streams and replaces "released" demand-cast streams with new demand-cast streams upon receipt of a request message from the SM 702. In a preferred embodiment, the TSG 704 also keeps track of the order in which the streams are released, so that the oldest released stream may be used as the preferred candidate for replacement.

If all the demand-cast streams in a particular IPG multiplexed transport stream are "acquired," then a new stream cannot be inserted, and so the TSG 704 refuses the request. In such a case, a message indicating such a refusal may be sent to the SM 702 and/or the requesting terminal 706.

In one embodiment, the terminal 706 comprises a set-top terminal (STT) for use by a service subscriber. The STT may comprise an embedded system which includes a tuner, a demultiplexer, and a decoder. The STT drives the subscriber's display unit or TV set, and it may be connected to the TSG 704 by way of a RF feed from a cable distribution network. The IPG content may be received from a particular IPG multiplexed transport stream on a specific QAM carrier signal. In one embodiment, the IPG multiplexed transport stream may comprise an ensemble of elementary MPEG video streams, each representing a portion of the guide.

In a preferred embodiment, the terminal 706 includes IPG client software application which is resident at the terminal 706. The IPG client application is responsible for presenting the IPG to the subscriber. The IPG client application demultiplexes and decodes IPG pages requested by the user. If a requested page is already being received via the IPG multiplexed transport stream, then the IPG client application acquires the stream immediately and sends a message to the SM 702 that it has acquired the stream. If the requested page is not in the IPG multiplexed transport stream, then the IPG client application sends a request message to the SM 702. Subsequently, the IPG client application acquires the stream once it is received. In addition, when a stream is no longer being acquired, the IPG client application sends a release message to the SM 702. In one embodiment, if there is no remote control or other activity by the user for a period of time (for example, a few minutes), then the IPG client application times-out the acquisition. The time-out may be accomplished, for example, by sending a release message to the SM 702 and acquiring a broadcast stream instead.

5. Description Per Major Module

The demand-cast system consists of three major subsystems: the set top terminal (STT); the session manager (SM); and the transport stream generator (TSG.) A description of each subsystem follows.

A. STT (Set-Top Terminal)

The set top terminal is the end-user or cable service subscriber tuner/demultiplexer/decoder and embedded system. Currently, the STT used in initial pilot deployments is the General Instruments DCT-2000. It is connected to the cable operator RF feed. It drives the subscribers display unit or TV set. The IPG content is in the IPG transport stream (or multiplex) located on a specific QAM carrier. The IPG multiplex contains an ensemble of elementary MPEG video streams each representing portions of the guide. Some of these streams are guide grid pages. The STT receives messages from the head-end via tables in the private section of the IPG transport stream (in-band messaging.) The STT sends messages to the head-end via the out-of-band return path.

The IPG Application is the set top terminal resident program responsible for presenting the DIVA Interactive Program Guide to the subscriber. The IPG application demultiplexes and decodes IPG pages requested by the user. If a particular page is in the IPG transport stream, the STT acquires the stream immediately and informs the SM that it has requested it. If the page is not in the multiplex, the STT also sends a message to the SM that it has requested it. Then it acquires the stream once it's in the multiplex. When the STT no longer is acquiring a guide stream, it informs the SM that it has released it.

If the STT is on a demand-cast stream for more than 2 minutes without any remote control activity, it times-out. It acquires a broadcast stream instead and informs the SM that it has released the demand-cast stream.

B. SM (Session Manager)

The session manager is a computer residing at the cable head-end. Currently, the SM is a SPARC Station running Solaris. It is connected via Ethernet to the server side of the General Instruments network controller (NC) and is the receiver for OB return path messages originating from STTs. The SM can handle STTs on multiple cable nodes each served by a separate IPG multiplex. The SM communicates and controls the TSGs via Ethernet. The TSGs generate the IPG transport streams.

The SM manages one or multiple cable networks and monitors demand-cast stream usage. It tracks IPG demand-cast streams that are acquired by at least one STT maintaining a dynamic list of STTs that are using them. This is done for each multiplex managed by the SM. The SM accepts messages from STTs indicating that they have requested or released demand-cast streams. A STT that has acquired a demand-cast stream is registered to the stream and a STT that has released a demand-cast stream is removed from the streams registry. The SM informs the TSG once there are no longer any STTs on a particular demand-cast stream. It also informs the TSG when a STT requests a demand-cast stream.

The SM times-out any STT from a demand-cast stream if the box has not released the stream within a few minutes. It does this by removing it from the demand-cast stream's registry.

C. TSG (Transport Stream Generator)

The transport stream generator is a computer residing at the cable head-end. Currently, the TSG is a PCI WinNT system. It is connected via Ethernet to the SM controlling it. The TSG produces one or more IPG transport streams each broadcast to their respective nodes. The TSG communicates with the STTs by way of tables in the private section of the IPG transport streams. The table contains the list of available demand-cast streams along with the IP address of the source TSG (its IP address) and the channel number of the IPG multiplex. (which multiplex it is in the TSG)

The TSG manages the transport stream for each IPG multiplex it generates. It receives information from the SM on each demand-cast stream indicating whether the stream is currently acquired by any STT or released by all STTs. The TSG is informed by the SM when there is no longer any STT on a demand-cast stream. The TSG is informed by the SM when a STT requests a demand-cast stream. The TSG maintains status for all the demand-cast streams in each multiplex. It adjusts the status for each stream for which it receives a message from the SM. The basic status is 'acquired' for streams in use by one or more STTs or 'released' for streams that are not in use by any STT. The TSG keeps 'acquired' streams in its multiplexes and replaces 'released' streams with new demand-cast streams upon request. It also keeps track of which are the few oldest 'released' stream. The best candidate for replacement is always the oldest 'released' stream. If all the demand-cast streams in a multiplex are 'acquired' then a new stream can not be inserted and the TSG refuses the request.

V. Example of Interactive Program Guide

An embodiment of an interactive program guide in accordance with the present invention is described below. The embodiment is described for purposes of illustration and is not meant to limit the scope of the present invention.

Figure 8:
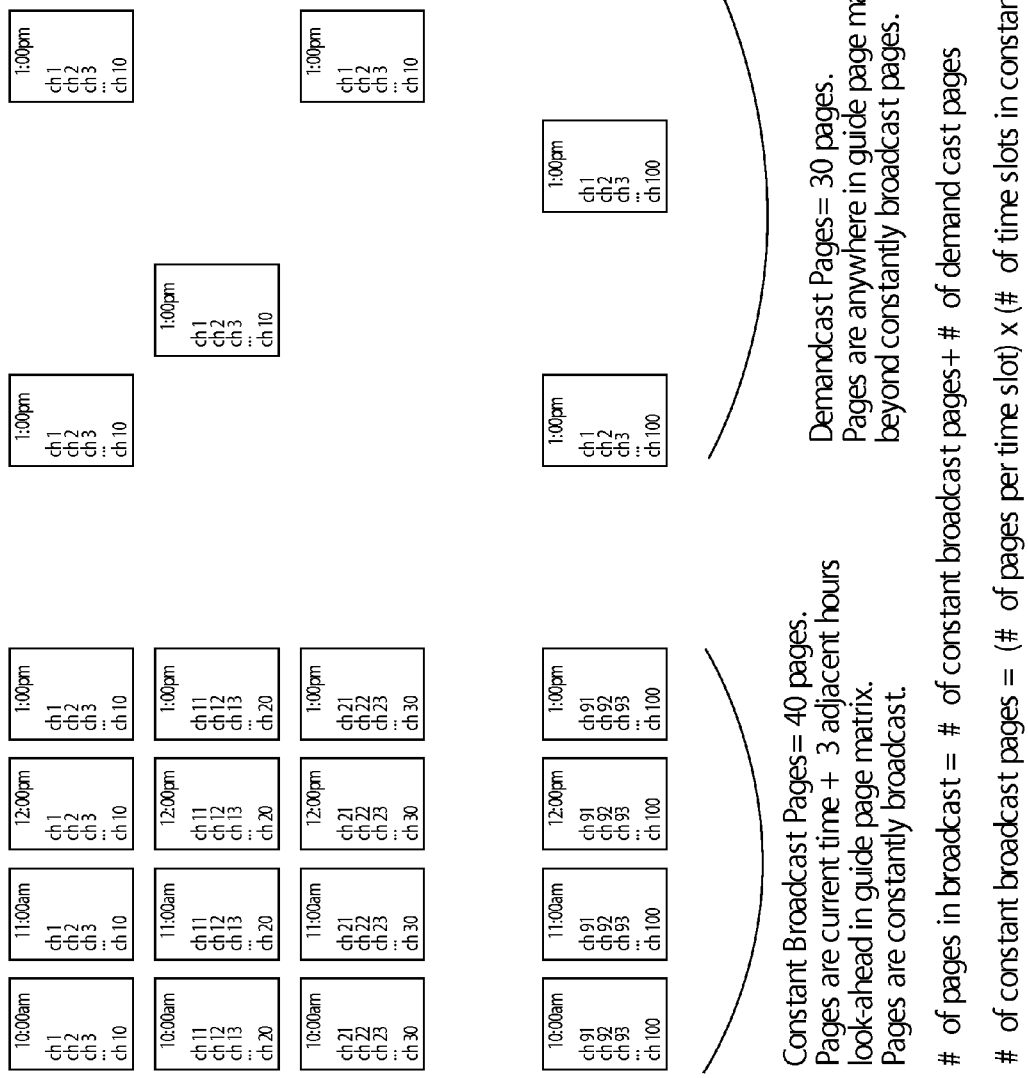
FIG. 8 depicts an example of a set of IPG pages for constant broadcast and other IPG pages for demand-cast in accordance with a preferred embodiment of the present invention.

FIG. 8 depicts an example of a set of IPG pages for constant broadcast and other IPG pages for variable demand-cast in accordance with a preferred embodiment of the present invention. In the example shown in FIG. 8, 40 IPG pages are constantly broadcast and up to 30 IPG pages may be variably demand-cast. There are 10 guide pages per time slot, and the constant broadcast includes 10 guide pages for the current timeslot and 30 guide pages for the next three hourly timeslots. The variably demand-cast pages may be any pages within the guide page matrix that are not currently being broadcast.

In such a system, when a request for a guide page is made by a particular terminal, either of two scenarios can occur. First, if the page is already in the IPG broadcast, then the terminal simply acquires the stream with the page from the broadcast. Second, if the page is not in the broadcast, then the terminal transmits a request for the page to the head-end. The head-end may then fulfill the request by replacing the least frequently accessed and not currently accessed stream being transmitted downstream with a stream containing the requested page.

Subsequently, the terminal will end its access of the guide page. This may occur because the user has instructed the terminal to view a different page. Alternatively, this may occur because of a time-out due to inactivity over a period of time (for example, 2 minutes). In any case, when the terminal is no longer accessing the guide page, then the terminal transmits a message to the head-end which indicates that the terminal has released the corresponding stream. Informing the head-end when variably demand-cast pages become released ensures that non-accessed demand-cast pages become available for substitution as described above.

One advantage of the preferred embodiment of the present invention is that, if a particular page is intensively accessed (such as a page listing a major sports event), then the system needs to insert the particular page only once into the transport stream. Once inserted, the page is readily accessible by multiple terminals without consuming additional bandwidth. Other systems would be more susceptible to blockage. Blockage would occur, for example, when a newly requested page cannot be inserted into the transport stream because there is no available bandwidth within the transport stream.

An IPG delivery system in accordance with a preferred embodiment of the present invention is a two-way system which is capable of two-way communications between set top terminals on the cable network and the equipment in the cable head-end. For example, communications may be transmitted from the terminals to the head-end via a back-channel, and content may be transmitted from the head-end to the terminals by insertion into a transport stream.

Figure 9:
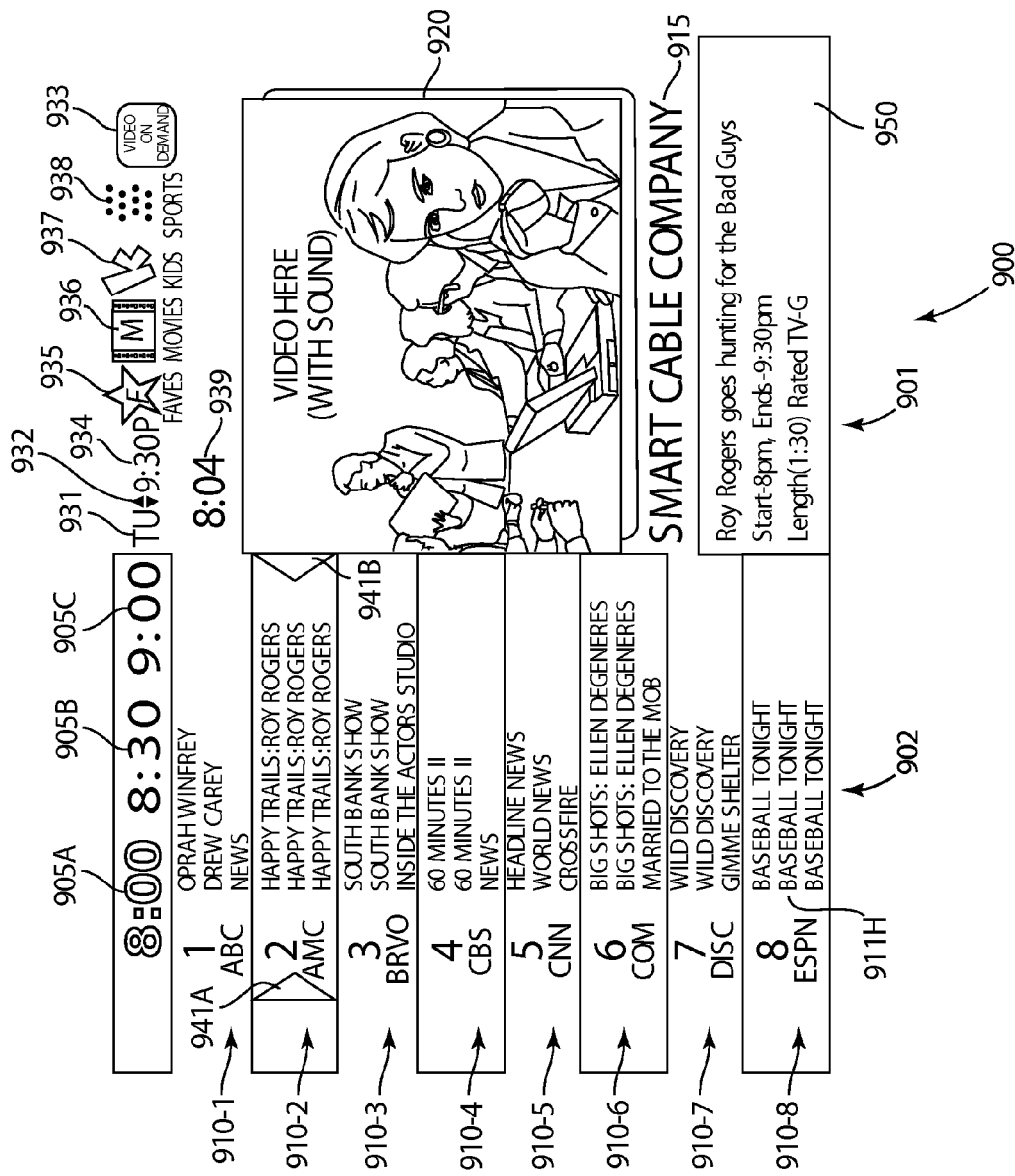
FIG. 9 depicts an example of one frame taken from a video sequence that can be encoded using the present invention.

FIG. 9 depicts an example of one frame taken from a video sequence of an IPG page in accordance with the present invention. The IPG page 900 of FIG. 9 comprises a first 905A, second 905B and third 905C time slot objects, a plurality of channel content objects 910-1 through 910-8, a pair of channel indicator icons 941A, 941B, a video barker 920 (and associated audio barker), a cable system or provider logo 915, a program description region 950, a day of the week identification object 931, a time of day object 939, a next time slot icon 934, a temporal increment/decrement object 932, a "favorites" filter object 935, a "movies" filter object 936, a "kids" (i.e., juvenile) programming filter icon 937, a "sports" programming filter object 938 and a VOD programming icon 933. It should be noted that the day of the week object 931 and next time slot icon 934 may comprise independent objects (as depicted in FIG. 9) or may be considered together as parts of a combined object.

In a system, illustratively, comprising 80 channels of information, the channels are displayed in 8-channel groups having associated with them three hour time slots. In this organization, it is necessary to provide 10 video PIDs to carry the present-time channel/time/title information, one or more audio PID to carry the audio barker and/or one or more data PIED (or other data transport method) to carry the program description data, overlay data and the like. To fully broadcast interactive program information up to 24 hours in advance, it is necessary to provide 160 (10*24/1.5) video PIDS, along with one or more audio and, optionally, one or more data PIDs. The amount of time provided for in broadcast video PIDs for the given channel groups comprises the time depth of the program guide, while the number of channels available through the guide (compared to the number of channels in the system) provides the channel depth of the program guide. In a system providing only half of the available channels via broadcast video PIDs, the channel depth is said to be 50%. In a system providing 12 hours of time slot "look-ahead," the time depth is said to be 12 hours. In a system providing 16 hours of time slot "look-ahead" and 4 hours of time slot "look-back," the time depth is said to be +16/−4 hours.

The video streams representing the IPG are carried in a single transport stream or multiple transport streams, within the form of a single or multi-programs as discussed previously in this invention. A user desiring to view the next 1.5 hour time interval (e.g., 9:30-11:00) may activate a "scroll right" object (or move the joystick to the right when a program within program grid 902 occupies the final displayed time interval). Such activation results in the controller of the STT noting that a new time interval is desired. The video stream corresponding to the new time interval is then decoded and displayed. If the corresponding video stream is within the same transport stream (i.e., a new PID), then the stream is immediately decoded and presented. If the corresponding video stream is within a different transport stream, then the related transport stream is extracted from the broadcast stream and the related video stream is decoded and presented. If the corresponding transport stream is within a different broadcast stream, then the related broadcast stream is tuned, the corresponding transport stream is extracted, and the desired video stream is decoded and presented.

A user interaction resulting in a prior time interval or a different set of channels results in the retrieval and presentation of a related video stream. If the related video stream is not part of the broadcast video streams, then a pointcast session, for example, may be initiated as described above in relation to FIGS. 4A and 4B. For this purpose, the STT sends a request to the head end via the back channel requesting a particular stream. The head end then processes the request, retrieves the related stream from the information server, incorporates the stream within a transport stream as a video PID (preferably, the transport stream currently being tuned/selected by the STT) and informs the STT which PID should be received, and from which transport stream it should be demultiplexed. The STT then retrieves the related video PID. In the case of the video PID being within a different transport stream, the STT first demultiplexes the corresponding transport stream (possibly tuning a different QAM stream within the forward channel).

Normally, upon completion of the viewing of the desired stream, the STT indicates to the head end that it no longer needs the stream, whereupon the head end tears down the pointcast session. The viewer is then returned to the broadcast stream from which the pointcast session was launched. However, as described above in relation to FIGS. 6A, 6B, and 6C, the method for "sharing" pointcasts may avoid the need to tear down the pointcast session if another STT is still utilizing the pointcast. In addition, the above described pointcast sharing technique more efficiently utilizes the network bandwidth allocated to pointcasts.

Now consider the difference in latencies between push demand-casts and pull demand-casts. Access to IPG pages with low latency is a desirable feature in providing a program guide. A system which only pushes IPG pages would offer potentially the lowest latency access, whereas a system which only pulls pages would incur significant delays in accessing each page.

In accordance with a preferred embodiment of the present invention, frequently accessed IPG pages such as those in the current time slot and near look-ahead time slots, and perhaps prime-time slots would be push demand-cast constantly so as to remain accessible with low latency. Less frequently accessed far look-ahead pages would be pull demand-cast.

VI. Example Implementational Architectures

The first through fourth (1000 through 1300) implementational architectures described below are illustrative implementational architectures which may be used to implement the present invention. They are not meant to limit the present invention to those specific embodiments.

FIG. 10 depicts a first implementational architecture 1000 for managing delivery of video sequences of an interactive program guide in accordance with an embodiment of the present invention. The first implementational architecture 1000 includes a key manager 1002, a subscription/billing manager 1004, an IPG generator 1006, and a head-end 102. This first architecture 1000 provides for encryption of the IPG content.

The head-end 102 is coupled to a multitude of STTs 108 by way of both an in-band network and an out-of-band (OOB) network. The head-end 102 includes various components which are coupled together and interact with each other. The head-end 102 illustrated includes an advertising/html content source 1008, an IPG content source 1009, a compositor 1010, an encoder 1012, a processor 1014, a multiplexor 1016, an encryptor 1018, an in-band delivery system 1020, a controller 1022, a session manager 1024, an access manager 1026, a bandwidth manager 1028, and out-of-band (OOB) equipment 1030.

Note that the session manager 702 of FIG. 7 encompasses the functionality of multiple components of FIG. 10, including the session manager 1024 and the bandwidth manager 1028. Also, note that the transport stream generator 704 of FIG. 7 encompasses the functionality of multiple components of FIG. 10, including the processor 1014 and the mux 1016.

Figure 11:
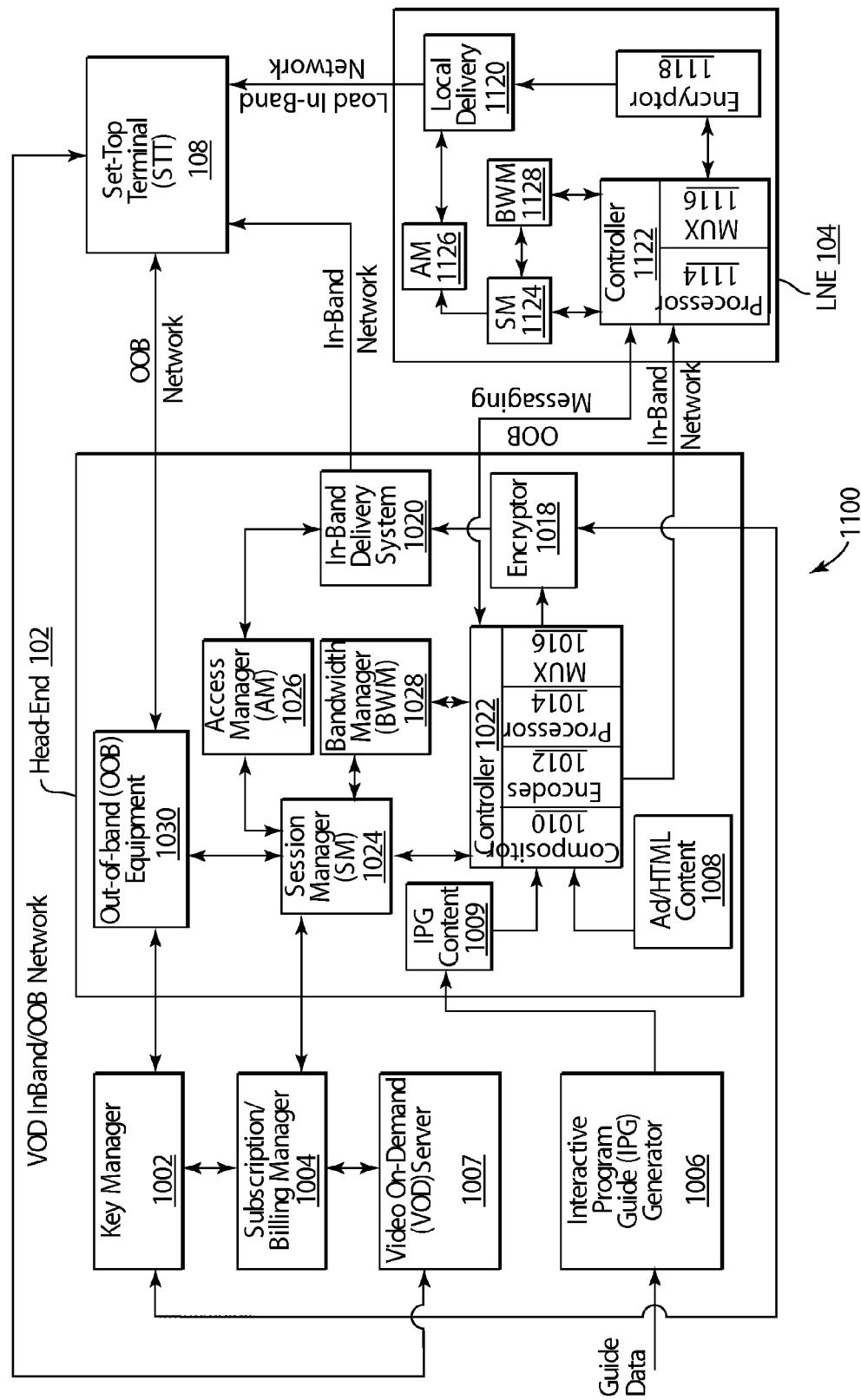
FIG. 11 depicts a second implementational architecture 1100 for managing delivery of video sequences of an interactive program guide in accordance with an embodiment of the present invention.

FIG. 11 depicts a second implementational architecture 1100 for managing delivery of video sequences of an interactive program guide in accordance with an embodiment of the present invention. The second implementational architecture 1100 includes the components of the first implementational architecture 1000. In addition, the second implementational architecture 1100 includes local neighborhood equipment 104 and a video-on-demand (VOD) server 1102. This second architecture 1100 provides for encryption of the IPG content.

The LNE 104 is coupled to the HE 102 by way of an in-band network and an OOB messaging system. The LNE 104 is also coupled to a multitude of STTs 108 by way of a local in-band network. The LNE 104 includes various components which are coupled together and interact with each other. The type of components in the LNE 104 are typically a subset of the type of components in the HE 102. The LNE 104 illustrated includes a processor 1114, a multiplexor 1116, an encryptor 1118, a local delivery system 1120, a controller 1122, a session manager (SM) 1124, an access manager (AM) 1126, and a bandwidth manager (BWM) 1128.

Figure 12:
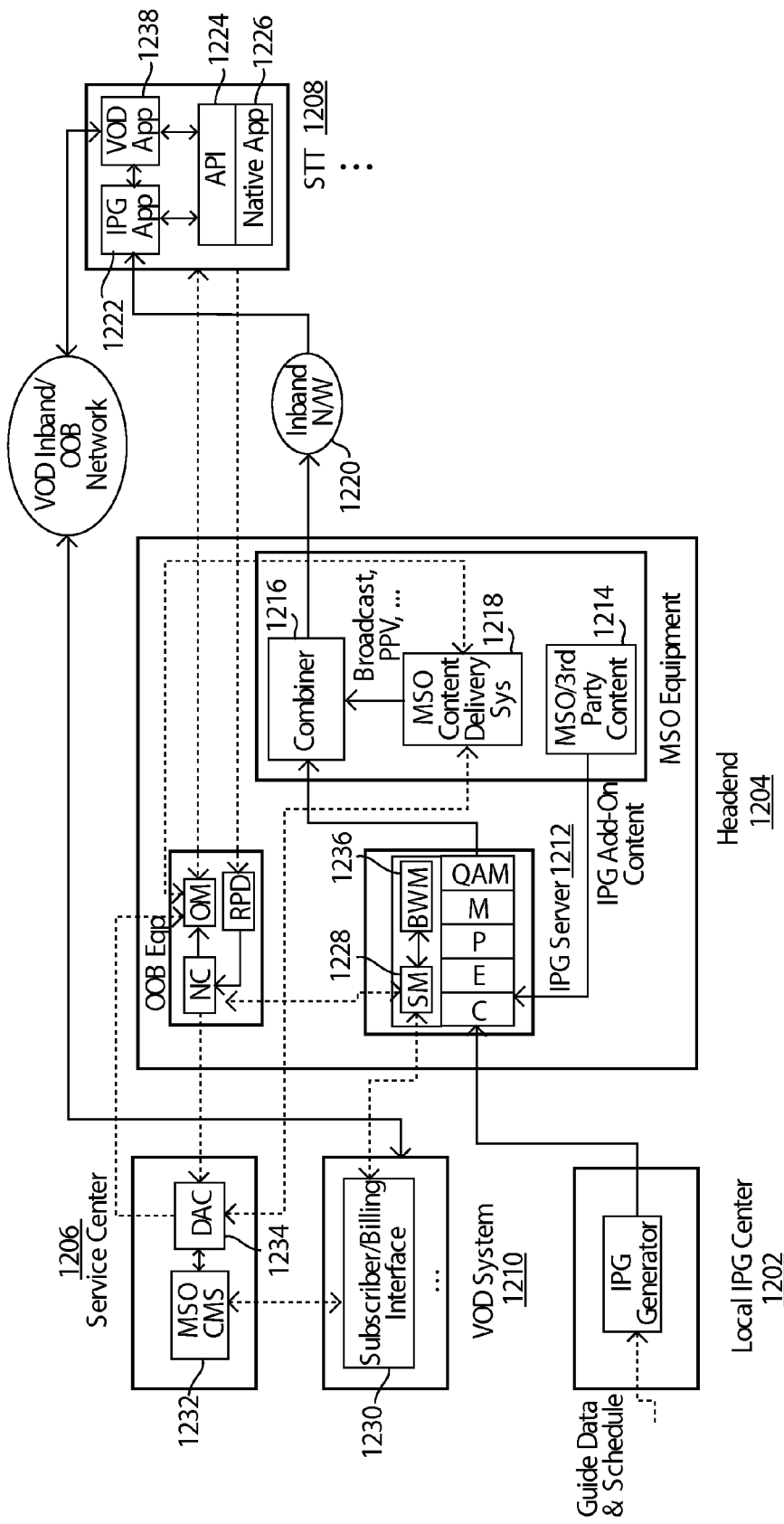
FIG. 12 depicts a third implementational architecture 1200 for managing delivery of video sequences of an interactive program guide in accordance with an embodiment of the present invention.

FIG. 12 depicts a third implementational architecture 1200 for managing delivery of video sequences of an interactive program guide in accordance with an embodiment of the present invention. The implementational architecture 1200 includes a local IPG center 1202, a headend 1204, a service center 1206, and a plurality of set-top terminals (STT) 1208. In addition, the system may be integrated with a video on-demand (VOD) system 1210 and a corresponding VOD application 1238 at the STT 1208. This third architecture 1200 does not provide for encryption of the IPG content.

The local IPG center 1202 generates guide page user interface (UI) screens and periodically sends the UI screens to an IPG server 1212 at the headend 1204. MSO/third party IPG add-on content 1214 may be provided to the IPG server 1212 from MSO equipment within the headend 1204. For example, the add-on content may include real-time advertisement video or HTML pages for electronic commerce.

The IPG server 1212 composes (C), encodes (E), processes (P), multiplexes (M), and modulates (QAM) the IPG content (guide plus add-on content) and transmits it to a combiner 1216. The combiner 1216 combines the IPG content with broadcast TV, premium content (e.g., HBO), pay-per-view (PPV), and other content from a multiple service operator (MSO) content delivery system 1218. The combined content is then broadcast to the STTs 1208 via an in-band distribution network 1220.

Upon viewer tuning of the STT 1208 to the IPG channel, an IPG application 1222 at the STT 1208 processes the IPG stream and provides the IPG via an application programming interface (API) 1224 to a "native" application 1226 running on the STT 1208. The native application 1226 decodes and presents the IPG to the viewer.

In one embodiment; the TV program guide for a current time period (1.5 hours) is broadcast to viewers. In addition, two weeks of lookahead TV programming may be delivered to viewers on demand via demand-cast. Upon a view action of moving a cursor to a lookahead time interval, the STT 1208 sends a request via a backchannel to a session manager (SM) 1228 [for example, via an OOB channel to a reverse path demodulator (RPD), then to a network controller (NC), then to the SM 1228]. The SM 1228 then causes the IPG server 1212 to multiplex the requested IPG page into the IPG stream.

The SM 1228 also interacts with a subscription/billing interface 1230 in the VOD system 1210 to coordinate access to VOD services from a link in the IPG user interface (UI). The UI also provides for access to premium content and pay-per-view purchasing by interacting through a two-way interface to a MSO customer management system (CMS) 1232 and digital access controller (DAC) 1234 in the service center 1206. The DAC 1234 generates digital encryption-related keys.

The implementational architecture 1200 also includes a bandwidth manager (BWM) 1236. As described above, the BWM 1236 provides techniques for more efficient utilization of the finite bandwidth available for distribution of the IPG.

Note that the session manager 702 of FIG. 7 encompasses the functionality of multiple components of FIG. 12, including the session manager 1228 and the bandwidth manager 1236. Also, note that the transport stream generator 704 of FIG. 7 encompasses the functionality of multiple components of FIG. 12, including the processor (P) and the multiplexer (M).

Figure 13:
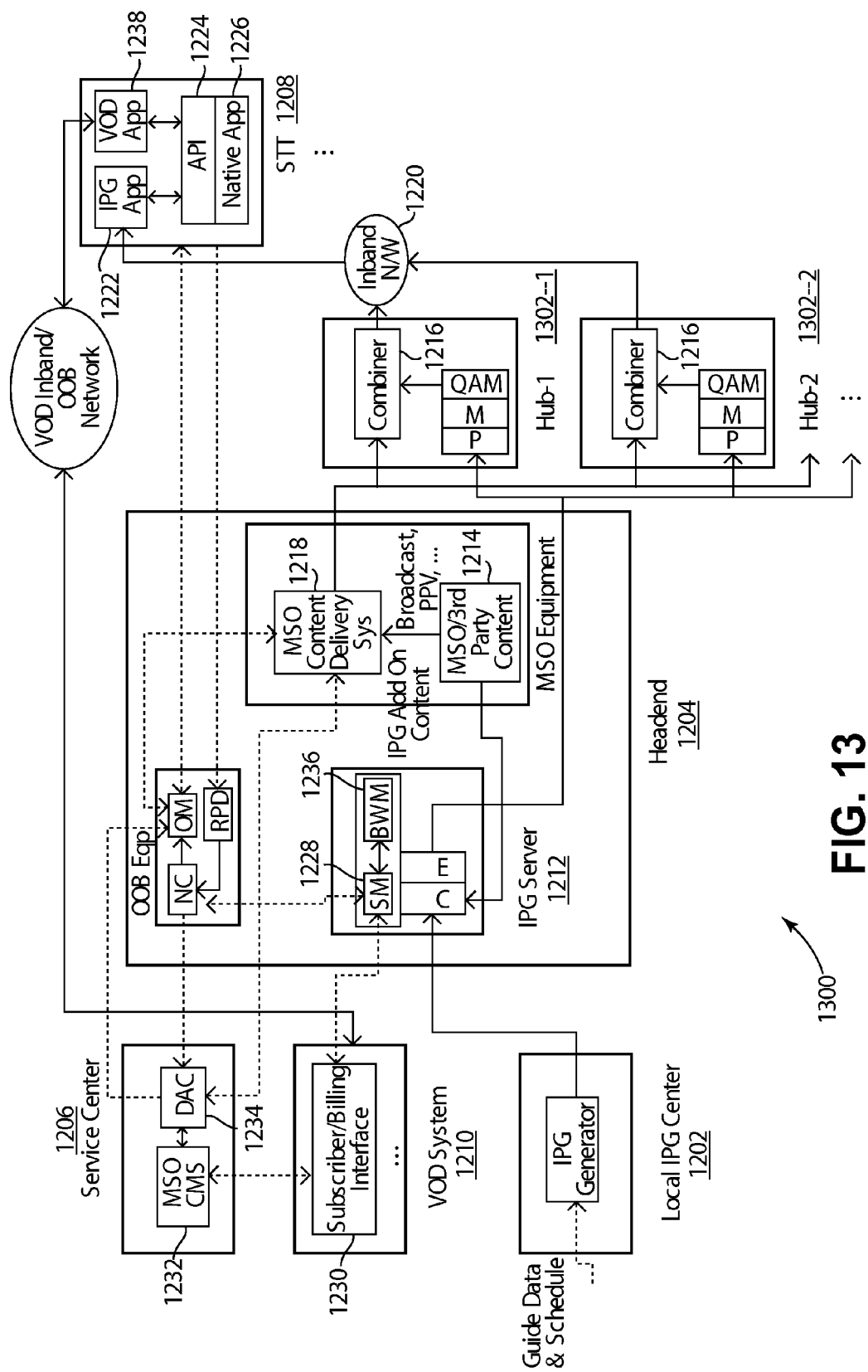
FIG. 13 depicts a fourth implementational architecture 1300 for managing delivery of video sequences of an interactive program guide in accordance with an embodiment of the present invention.

FIG. 13 depicts a fourth implementational architecture 1300 for managing delivery of video sequences of an interactive program guide in accordance with an embodiment of the present invention. The implementational architecture 1300 of FIG. 13 has many similarities to the implementational architecture 1200 of FIG. 12. This fourth architecture 1300 does not provide for encryption of the IPG content.

The fourth implementational architecture 1300 differs from the third implementational architecture 1200 primarily in that some of the equipment is distributed from the headend 1204 to a plurality of hubs 1302 in the distribution system. In particular, the combiner 1216 is moved from the headend 1204 to each of the hubs 1302. In addition, the processor (P), multiplexer (M), and modulator (QAM) are moved from the headend 1204 to each of the hubs 1302. Thus, the functionality of the TSG 704 is transferred to the hubs 1302.

VII. Messaging Protocol

Returning attention to the system 700 of FIG. 7, the following describes a messaging protocol for communicating between the major components of the system 700. The messaging protocol is described in relation to FIGS. 14-17. Although a specific messaging protocol is described below, the present invention is not meant to be limited to that specific protocol.

First, the "source" transport stream generator (TSG) 704 communicates to a terminal 706 via, for example, a one-way in-band channel. The communication may be, for example, in the form of a "demand-cast index table" within a private section of the IPG MPEG transport stream. FIG. 14 depicts an embodiment for the content of the demand-cast index table. The content may include: (a) a table version number (which increments when the table content changes); (b) a list of available demand-cast streams; (c) an internet protocol (IP) address for the source TSG; (d) a MUX channel number within the source TSG, and (e) a time of day and day of week.

Second, the terminal 706 communicates with the session manager (SM) 702 via, for example, a one-way out-of-band return path. The return path may be implemented, for example, using a user datagram protocol/internet protocol (UDP/IP) service to connect the terminal 706 to a network controller (NC) at the SM 702. FIG. 15 depicts one embodiment for the contents of the messages sent from the terminal 706 to the SM 702. The message content as shown includes: (a) a demand-cast stream identification; (b) the terminal's identification; (c) the IP address of the source TSG; (d) the MUX channel number within the source TSG; and (e) the message information itself. The message information may indicate: (1) an acquisition of the demand-cast stream by the terminal 706; (2) a release of the demand-cast stream by the terminal 706; or (3) a request for the demand-cast stream by the terminal 706.

Third, the SM 702 communicates with the source TSG 704 via, for example, a two-way communications channel. The two-way communications channel may comprise, for example, a TCP/IP connection over an Ethernet network. FIG. 16 depicts one embodiment for the contents of the messages sent from the SM 702 to the TSG 704. The message content as shown includes: (a) the demand-cast stream identification; (b) the MUX channel number within the source TSG; and (c) a message/command from a set of messages/commands. The set of messages/commands include: (1) demand-cast stream released (no longer acquired by any terminal); (2) demand-cast stream requested; and (3) a reset command.

Messages from the SM 702 to the TSG 704 may be acknowledged by the TSG 704. FIG. 17 depicts one embodiment for the contents of the acknowledgement messages sent by the TSG 704 back to the SM 702. An acknowledgement message as shown includes: (a) the demand-cast stream ID; (b) the MUX channel number; (c) the TSG's address; and (d) the acknowledgement itself. The acknowledgement may convey acknowledgement of: (1) release of the demand-cast stream; (2) request for the demand-cast stream; or (3) reset of the TSG 704.

VIII. Stream Status and Conversions of Status

The following relate to stream status and conversions of status in accordance with a preferred embodiment of the present invention. Although a specific embodiment of stream status and conversions of status is described below, the present invention is not meant to be limited to that specific embodiment.

1. Stream Status within IPG Multiplex

The TSG 704 models bandwidth usage for each IGP multiplexed transport stream that it is managing. Each demand-cast stream within each transport stream may be either active or inactive. Active streams are currently being multiplexed into the transport stream. Inactive streams are not currently being multiplexed into the transport stream.

FIG. 18 depicts an example showing statuses of active demand-cast streams in an IPG multiplex within a TSG 704. For each demand-cast stream, TSG assigns status with respect to the streams intended multiplex. Demand-cast stream status, in context of the TSG, are:

1) 'active' streams are in the IPG multiplex
   1.1) 'acquired' demand-cast streams are in the multiplex and are used by at least one STT. They are referenced in the demand-cast index table in the private section of the IPG transport stream. They are not candidates for removal.
   1.2) 'released' demand-cast streams are in the multiplex and are not used by any STT. They are referenced in the demand-cast index table. They can become 'passive.'
      1.2.1) 'passive' demand-cast streams are also technically 'released'. They are in the multiplex and are not used by any STT. They are not referenced in the demand-cast index table. They are typically a small fraction of the 'released' demand-cast streams. The oldest few 'released' demand-cast streams are forced to 'inactive' status by a maintenance thread. They are candidates for removal.
2) 'inactive' demand-cast streams are not in the IPG multiplex. They are not referenced in the demand-cast index table. They may be inserted in the multiplex.

Note that the TSG may remove all the 'passive' demand-cast streams from their respective IPG multiplexes and replace them with null packets. It is however advantageous to leave 'passive' demand-cast streams in the multiplex because if a STT attempts to acquire it, latency will be minimized.

2. Conversions of Status

The TSG receives messages from the SM. Messages received from the SM are:

1) "request demand-cast stream"
2) "release demand-cast stream" The "release demand-cast stream" message includes the maximum number of STTs that were registered to the demand-cast stream.
3) "reset"

Figure 19:
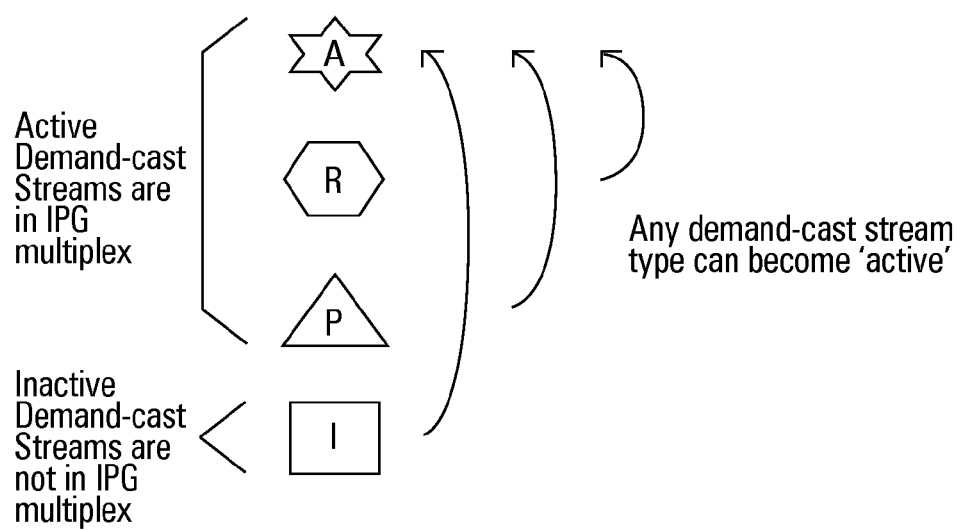
FIG. 19 illustrates the various scenarios for activation of a demand-cast stream.

1) TSG Request Demand-Cast Stream a) If the TSG receives a "request demand-cast stream" message from the SM, then the following scenarios for activating the stream are possible. FIG. 19 illustrates the various scenarios for activation of a demand-cast stream.

i) If the demand-cast stream is currently 'inactive', then

In a first case, if there is a 'passive' demand-cast stream in the corresponding multiplex, then the TSG removes an 'passive' demand-cast stream from its corresponding multiplex, thereby making it 'passive' and replaces it with the new requested demand-cast stream. The TSG adds reference to the new 'active' demand-cast stream in the demand-cast index table. The TSG assigns the status 'active' to the newly inserted demand-cast stream. The TSG acknowledges SM for the "request demand-cast stream" message by sending a "success" message back to the SM.

In a second case, if there are no 'passive' demand-cast streams in the corresponding multiplex, but there is a 'released' demand-cast stream therein, then the TSG forces the oldest 'released' demand-cast stream to 'inactive' status and then follows the steps described directly above.

Finally, in a third case, if the TSG finds no 'passive' or 'released' demand-cast stream in the corresponding multiplex, it can not fulfill the request. It acknowledges the SM for the "request demand-cast stream" message by sending a "fail" message back to the SM.

ii) If the demand-cast stream is currently 'released' or 'passive', then

The TSG changes the status of the 'released' or 'passive' demand-cast stream to 'acquired.' It acknowledges the SM for the "request demand-cast stream" message by sending a "success" message back to the SM.

2) TSG Release Demand-Cast Stream

If the TSG receives a "release demand-cast stream" message from the SM, then the TSG acknowledges the SM by sending a "success" message. If the demand-cast stream is currently 'acquired', then the TSG changes the status of the stream to 'released.'

3) Released Stream to Passive Stream Conversion

Removal of a 'released' demand-cast streams could be done, however, such removal would be disadvantageous. Initially, the reference to the 'released' demand-cast stream would have to be removed from the "demand-cast index table", then a few seconds later, the stream could be physically removed from the multiplex. This delay between removal from the table and from the multiplex is necessary to prevent a race condition where a STT is acquiring a demand-cast stream while the TSG is in the process of removing it. Therefore, only 'passive' streams are removed in accordance with a preferred embodiment of the present invention.

The ratio of 'passive' to 'released' demand-cast may be specified in the TSG configuration file. It may be maintained as a percentage (i.e. 10% of 'released' streams are converted to 'passive') or it can be maintained as an absolute number (i.e. so as to ensure that there are usually two or three 'inactive' demand-cast streams).

Figure 20:
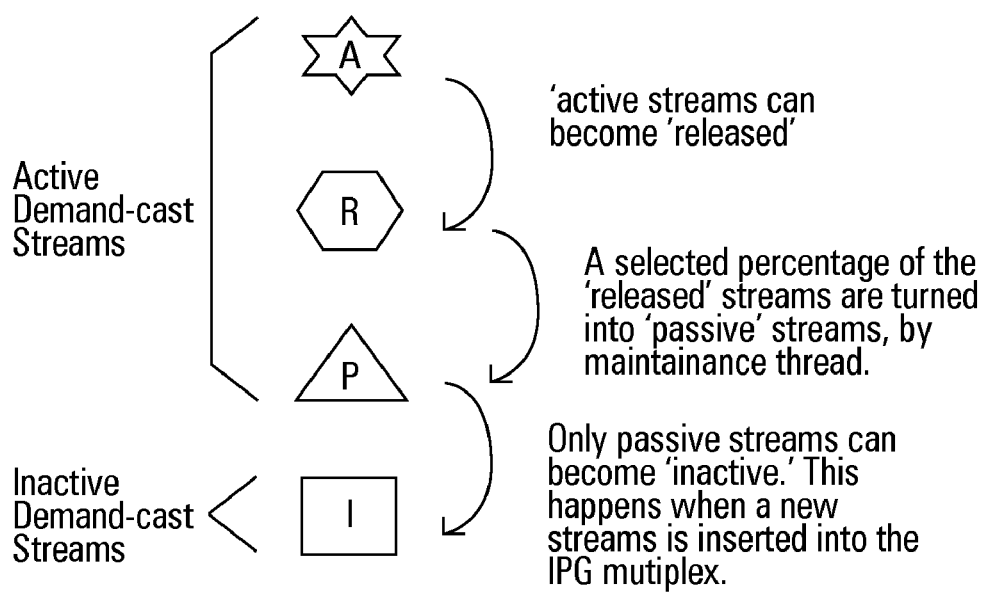
FIG. 20 illustrates an overall process by which a released stream may be converted to a passive stream.

FIG. 20 illustrates an overall process by which a released stream may be converted to a passive stream. Methods for determining which released streams are converted to passive streams include: an aging method and a statistical method. In the aging method, the oldest few 'released' demand-cast streams are constantly converted to 'passive' status by a maintenance thread. In the statistical method, the "release demand-cast stream" messages include statistical data regarding the demand-cast stream. This data is the maximum number of STTs that were on a released stream before it was released. The TSG converts those demand-cast streams that have had the least amount of users to 'passive' status.

VIII. Other Technical Aspects

The following are further technical aspects in accordance with a preferred embodiment of the present invention. Although a specific embodiment of those aspects is described below, the present invention is not meant to be limited to that specific embodiment.

1. Initial Conditions

A. STT

When the STT launches the IPG application, it tunes to the QAM carrying the IPG transport stream. When the STT requests its first demand-cast stream it opens the IPG channel with the SM. When the QAM is tuned, the STT acquires the demand-cast index table and sends an Init command to SM.

B. SM

Initially the SM knows nothing about the IPG multiplex fed to its client STTs. Upon receiving a first "request demand-cast stream" message from a STT, it verifies that it is aware of the mux ID. Mux ID includes TSG IP address and mux channel within the TSG. If it is aware, then nothing happens. If it is not aware, the TSG opens a communication socket with the source TSG. The SM maintains a log where it registers all muxes that it controls. For each mux in the log, the TSG IP address and mux channel number is recorded.

C. TSG

Initially, the TSG is configured through its own configuration file. Configuration includes the number of demand-cast streams that can be supported by each IPG mux. The absolute number of 'passive' streams or the ratio of 'passive' streams to 'released' streams is specified in the configuration file.

2. Reset

A. SM

If the SM is down, upon reset, it looks-up TSG log file and sends a reset command to the TSG.

B. TSG

When TSG receives a "reset" command from the SM, it removes reference to all demand-cast streams in the demand-cast index table in the multiplex referenced by the mux ID in the reset command. Then a few second later, the TSG removes all the demand-cast streams within the multiplex.

C. STT

When the STT does not "see" the PID of the demand-cast stream it is acquiring in the demand-cast index table, it acquires a default IPG broadcast PID. If the STT does not see the demand-cast index table, the STT exits the IPG application.

3. Scalability

A. TSG

Each TSG can manage more than one IPG multiplex. IPG multiplex is referred to by the IPG address of the host TSG and the mux channel number on the TSG.

B. SM

SM can manage more than one TSG. Each IPG multiplex is referred to by the IPG address of the host TSG and the mux channel number on the TSG.

C. STT

STT messages regarding demand-cast streams include demand-cast stream ID, TSG IP address and the mux channel number on the TSG.

While specific embodiments and applications of the present invention have been illustrated and described, it is to be understood that the invention is not limited to the precise configuration and components disclosed herein and that various modifications and variations which will be apparent to those skilled in the art may be made in the arrangement, operation, and details of the method and apparatus of the present invention disclosed herein without departing from the spirit and scope of the invention as defined in the following claims.

What is claimed is:

1. A system for providing access to an array of guide pages from an interactive program guide within constraints imposed by limited bandwidth available in a distribution network, the system comprising:

a distribution control center coupled to the distribution network;

a session manager configured to monitor and control usage of demand-cast stream bandwidth within the distribution network; and a transport stream generator configured to:

receive demand-cast guide page usage information from the session manager, determine, based on the received information, an unaccessed demand-cast guide page of a transport stream, the transport stream comprising multiple demand-cast streams containing corresponding demand-cast guide pages, wherein the demand-cast guide pages were generated as video sequences, determine a replacement demand-cast guide page of the array of guide pages to replace the unaccessed demand-cast page by substituting a demand-cast stream of the unaccessed demand-cast page with a demand-cast stream of the replacement demand-cast page, wherein the demand-cast stream of the replacement demand-cast page is multiplexed into the transport stream, and transmit the transport stream toward a plurality of terminals via the distribution network for delivering toward at least one of the plurality of terminals a requested demand-cast guide page requested by the at least one terminal.

2. The system of claim 1, wherein the plurality of terminals are coupled to a node within the distribution network, and said transport stream is transmitted from the transport stream generator to said node.

3. The system of claim 1, wherein the session manager receives demand-cast stream acquisition, release, and request messages from the plurality of terminals.

4. The system of claim 3, wherein said acquisition, release, and request messages are transmitted via out-of-band communications.

5. The system of claim 1, wherein the transport stream includes a list of available demand-cast streams, and said list is used by a terminal in determining whether a demand-cast stream has a particular demand-cast guide page of said array of guide pages that may be acquired immediately or needs to be requested.

6. The system of claim 5, wherein an acquisition message is sent from the terminal to the session manager if the stream is acquired, and a request message is sent from the terminal to the session manager if the stream needs to be requested.

7. The system of claim 6, wherein a release message is sent from the terminal to the session manager once the terminal is no longer acquiring the stream.

8. The system of claim 1, wherein the session manager tracks demand-cast streams that are acquired by at least one terminal by maintaining a dynamic list of terminals that are presently acquiring each demand-cast stream.

9. The system of claim 8, wherein the session manager informs the transport stream generator when a terminal request a demand-cast stream which is not present in the transport stream.

10. The system of claim 9, wherein the session manager informs the transport stream generator when there is no longer any terminals acquiring the demand-cast stream.

11. The system of claim 1, wherein the distribution control center comprises a cable headend.

12. The system of claim 1, wherein the transport stream generator is co-located with the session manager at the distribution control center.

13. The system of claim 1, wherein the transport stream generator is located separately from the session manager.

14. The system of claim 1, wherein the session manager comprises:
- a monitoring module for receiving acquisition, release, and request messages from the plurality of terminals;
- a tracking module for maintaining a dynamic list of terminals that are presently acquiring each demand-cast stream; and
- a controlling module for informing the transport stream generator when a terminal requests a demand-cast stream which is not present in the transport stream and for informing the transport stream generator when there is no longer any terminals acquiring the demand-cast stream.

15. The system of claim 1, wherein the transport stream generator comprises:
- an interface to a session manager for receiving the demand-cast guide page usage information from the session manager;
- a multiplexer for multiplexing demand-cast streams into the transport stream for transmission to the plurality of terminals via the distribution network; and
- a controller for controlling which demand-cast streams are multiplexed into the transport stream using the demand-cast guide page usage information.

16. The system of claim 1, wherein the transport stream generator determines the replacement demand-cast guide page upon receiving a request message from the session manager.

* * * * *